US011995211B2

(12) United States Patent
Nishida et al.

(10) Patent No.: US 11,995,211 B2
(45) Date of Patent: May 28, 2024

(54) SECURE AUTHENTICATION METHOD AND SECURE AUTHENTICATION SYSTEM

(71) Applicant: Panasonic Intellectual Property Corporation of America, Torrance, CA (US)

(72) Inventors: Naohisa Nishida, Osaka (JP); Tatsumi Oba, Osaka (JP); Yuji Unagami, Osaka (JP); Tadanori Teruya, Tokyo (JP); Nuttapong Attrapadung, Saitama (JP); Goichiro Hanaoka, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 327 days.

(21) Appl. No.: 17/546,606

(22) Filed: Dec. 9, 2021

(65) Prior Publication Data

US 2022/0100897 A1    Mar. 31, 2022

Related U.S. Application Data

(63) Continuation of application No. PCT/JP2020/037925, filed on Oct. 6, 2020.

(30) Foreign Application Priority Data

Oct. 11, 2019 (JP) .................................. 2019-187888

(51) Int. Cl.
*G06F 21/62* (2013.01)
*G06F 21/32* (2013.01)
*G06F 21/60* (2013.01)

(52) U.S. Cl.
CPC .......... *G06F 21/6245* (2013.01); *G06F 21/32* (2013.01); *G06F 21/602* (2013.01); *G06F 2221/031* (2013.01)

(58) Field of Classification Search
CPC .... G06F 21/602; G06F 21/32; G06F 21/6245; G06F 2221/031
See application file for complete search history.

(56) References Cited

U.S. PATENT DOCUMENTS 8,094,821 B2 * 1/2012 Hsu ...................... H04L 9/3271
  713/168
9,678,976 B2 * 6/2017 Lambright .......... G06F 16/1752
(Continued)

OTHER PUBLICATIONS

Jin, Zhe, et al. "Ranking-based locality sensitive hashing-enabled cancelable biometrics: Index-of-max hashing." IEEE Transactions on Information Forensics and Security 13.2 (2017) (Year: 2017).*

(Continued)

*Primary Examiner* — Syed A Zaidi
(74) *Attorney, Agent, or Firm* — Greenblum & Bernstein, P.L.C.

(57) ABSTRACT

A secure authentication method includes: deriving a distributed LSH value using secret LSH, taking a first distributed feature amount which is a feature amount of user information distributed through a secret distribution method and encrypted LSH parameters as inputs; deriving a distributed hash value using a secret unidirectional function, taking the distributed LSH value and a distributed key as inputs; decoding the hash value by reversing distribution of the distributed hash value; selecting, from a secret hash table storing sets of a hash value as an index and a distributed feature amount as a data string, a set including a hash value matching the decoded hash value; computing, in secret, similarity between the distributed feature amount in the set and the first distributed feature amount; deriving, in secret, a user authentication result based on the similarity computed; and outputting the derived authentication result.

17 Claims, 12 Drawing Sheets

(56) References Cited

U.S. PATENT DOCUMENTS

| | | | | |
|---|---|---|---|---|
| 9,774,578 | B1* | 9/2017 | Ateniese | G06F 3/0673 |
| 9,935,948 | B2* | 4/2018 | Schultz | H04L 63/0442 |
| 10,630,465 | B2* | 4/2020 | Kobayashi | H04L 9/0838 |
| 2007/0157026 | A1* | 7/2007 | Zimmermann | H04M 3/16 |
| | | | | 713/171 |
| 2008/0209227 | A1* | 8/2008 | Venkatesan | H04L 9/3236 |
| | | | | 713/186 |
| 2011/0055585 | A1* | 3/2011 | Lee | H04L 9/3226 |
| | | | | 713/183 |
| 2012/0167169 | A1* | 6/2012 | Ge | H04L 9/321 |
| | | | | 726/2 |
| 2022/0353089 | A1* | 11/2022 | Masny | H04L 9/3247 |

OTHER PUBLICATIONS

NPL Search Terms (Year: 2023).*
Bahmani, Bahman, Ashish Goel, and Rajendra Shinde. "Efficient distributed locality sensitive hashing." Proceedings of the 21st ACM international conference on Information and knowledge management. 2012. (Year: 2012).*
NPL Search Terms (Year: 2024).*
Extended European Search Report (EESR) from European Patent Office (EPO) in European Patent Appl. No. 20873984.7, dated Oct. 31, 2022.
Hao Chen et al: "SANNS: Scaling Up Secure Approximate k-Nearest Neighbors Search", arxiv.org, Cornell University Library, 201 Olin Library Cornell University Ithaca, NY 14853, Apr. 3, 2019 (Apr. 3, 2019), XP081164481.
Beaver D et al: "The Round Complexity of Secure Protocols", Theory of Computing, ACM, 2 Penn Plaza, Suite 701 New York Ny 10121-0701 USA, Apr. 1, 1990 (Apr. 1, 1990), pp. 503-513, XP058243598.
International Search Report (ISR) from International Searching Authority (Japan Patent Office) in International Pat. Appl. No. PCT/JP2020/037925, dated Jan. 12, 2021, together with an English language translation.
Charikar, "Similarity Estimation Techniques from Rounding Algorithms", STOC, ACM (https://www.cs.princeton.edu/courses/archive/spring04/cos598B/bib/CharikarEstim.pdf), May 19-21, 2002, pp. 1-9.
Cheon et al., "Homomorphic Encryption for Arithmetic of Approximate Numbers", (https://eprint.iacr.org/2016/421.pdf), pp. 1-23.
Fan et al., "Somewhat Practical Fully Homomorphic Encryption", (https://eprint.iacr.org/2012/144.pdf), pp. 1-19.
Daemen et al., "The Rijndael Block Cipher", AES Proposal, (https://csrc.nist.gov/csrc/media/projects/cryptographic-standards-and-guidelines/documents/aes-development/rijndael-ammended.pdf), pp. 1-47.
Indyk et al., "Approximate Nearest Neighbors: Towards Removing the Curse of Dimensionality", STOC, (https://www.cs.princeton.edu/courses/archive/spr04/cos598B/bib/IndykM-curse.pdf), 1998, pp. 604-613.
Ning et al., "Constant-Rounds, Linear Multi-party Computation for Exponentiation and Modulo Reduction with Perfect Security", (https://eprint.iacr.org/2011/069.pdf), pp. 1-26.
Li et al., "b-Bit Minwise Hashing", (https://arxiv.org/pdf/0910.3349.pdf), Oct. 18, 2009, pp. 1-10.
Nishida et al., "Face Recognition Using Secret Face Image", Computer Security Symposium, Oct. 21-24, 2019, pp. 1250-1256.
Paillier, "Public-Key Cryptosystems Based on Composite Degree Residuosity Classes", Springer-Verlag Berlin Heidelberg, (https://rd.springer.com/chapter/10.1007%2F3-540-48910-X_16), 1999, pp. 223-238.
Nishide et al., "Multiparty Computation for Interval, Equality, and Comparison Without Bit-Decomposition Protocol", International Association for Cryptologic Research, (https://www.iacr.org/archive/pkc2007/44500343/44500343.pdf), 2007, pp. 343-360.
Riazi et al., "Sub-Linear Privacy-Preserving Near-Neighbor Search", (https://arxiv.org/abs/1612.01835), Oct. 17, 2019, pp. 1-18.
Shamir, "How to Share a Secret", Communications of the ACM, vol. 22, No. 11, (http://cs.jhu.edu/~sdoshi/crypto/papers/shamirturing.pdf), Nov. 1979, pp. 612-613.
Titus et al., "SIG-DB: Leveraging homomorphic encryption to securely interrogate privately held genomic databases", PLOS Computational Biology, 14(9), (https://doi.org/10.1371/journal.pcbi.1006454), Sep. 4, 2018, pp. 1-16.
Yao, "How to Generate and Exchange Secrets", IEEE, (https://ieeexplore.ieee.org/document/4568207?arnumber=4568207), 1986, pp. 162-167.
Nishida et al., "Face Recognition Using Secret Face Image", Computer Security Symposium, Oct. 21-24, 2019, pp. 1250-1256, with an English language Abstract.

* cited by examiner

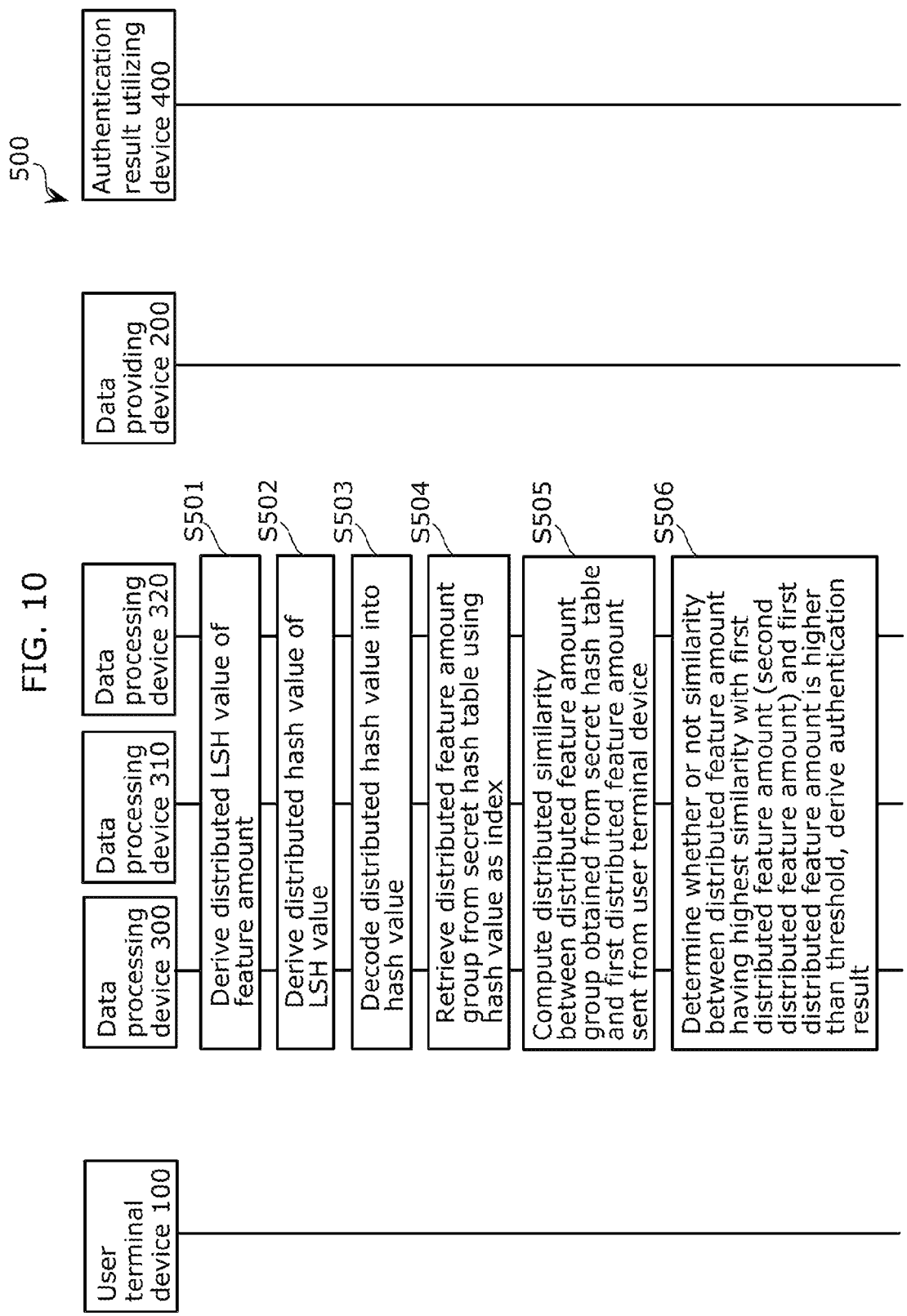

FIG. 11

When n = 3

$$\begin{array}{l} \{-18, -6, 8, -42, -25\} \\ \{15, -13, -19, 12, -4\} \\ \{-18, -24, 40, -12, 47\} \end{array}$$

FIG. 12

| LSH value computation formula |
|---|
| Input: $x \in R^d$ : Input vector<br>$\quad r_1, \ldots, r_m \in R^d$ : SimHash parameters<br>Output: $y \in \{0, 1\}^m$: SimHash value of input x<br>Procedure:<br>1: for i = 1 to m do<br>2: $\quad$ s ← InnerProduct (x, $r_i$)<br>3: $\quad$ t ← (s ≥ 0)<br>4: $\quad$ $y_i$ ← t<br>5: end for<br>6: Output y |

Example computation result

|  | i = 1 | i = 2 | i = 3 |
|---|---|---|---|
| $s_i$ | -299 | 12 | 241 |
| t = $y_i$ | 0 | 1 | 1 |
| y = LSH value | 3 |||

FIG. 13

| Index (LSH value) | Data (feature amount) |
|---|---|
| 0 | |
| 1 | ({5, 4, 3, 2, 1}) |
| 2 | |
| 3 | ({2, 2, 2, 4, 6}), ({1, 2, 3, 4, 5}) |
| 4 | |
| 5 | |
| 6 | |
| 7 | |

FIG. 14

| Server 1 | Server 2 | Server 3 |
|---|---|---|
| ({4, 7, 14, 43, 35}) | ({7, 12, 25, 82, 65}) | ({10, 17, 36, 121, 95}) |

| Hash value | Data string (distributed feature amount) |
|---|---|
| 0x3D48EA87DFB0D6D1 | |
| 0x526CD8B9777CBE6F | ({62, 15, 82, 37, 55}) |
| 0x1D989C3A6B9167E1 | |
| 0x0AD19774E333E6C8 | ({35, 40, 18, 97, 97}), ({80, 61, 17, 78, 64}) |
| 0x24BB29C97727B463 | |
| 0x26EFA89977360F2D | |
| 0x6264EF44D07AFC52 | |
| 0x3D006D42BB46172A | |

$p = 65519$

SECURE AUTHENTICATION METHOD AND SECURE AUTHENTICATION SYSTEM

CROSS REFERENCE TO RELATED APPLICATIONS

This is a continuation application of PCT International Application No. PCT/JP2020/037925 filed on Oct. 6, 2020, designating the United States of America, which is based on and claims priority of Japanese Patent Application No. 2019-187888 filed on Oct. 11, 2019. The entire disclosures of the above-identified applications, including the specifications, drawings and claims are incorporated herein by reference in their entirety.

FIELD

The present disclosure relates to a secure authentication method and a secure authentication system that authenticate a user while keeping user information and information related to the user information secret.

BACKGROUND

With improvements in the performance of image recognition using deep neural networks, the accuracy of authentication using, for example, a face image or the like of a user (known as "biometric authentication") is improving as well. In recent years, authentication using machine learning is being utilized in a variety of situations. For example, biometric authentication such as facial recognition is being used to make payments at convenience stores, for authentication when entering amusement facilities or event venues, and the like.

For a user to use such an authentication service, it is necessary for the user to send information about him/herself (i.e., user information) or a feature amount obtained from such information to a server. However, user information such as a face image is itself sensitive information and therefore must be protected. Additionally, attacks which infer original user information from feature amounts of the user information are known, and it is therefore necessary to protect the feature amount in addition to the user information.

There is thus a need for a technique for authenticating a user while keeping user information as well as information related to the user information (e.g., a feature amount or the like) secret.

For example, NPL 1 discloses a technique for authenticating a user while keeping user information and information related to the user information secret by encrypting, and sending to a server, a Locality Sensitive Hashing (LSH) value derived by a user terminal device and a feature amount of the user information. Additionally, for example, NPL 2 discloses a technique in which LSH values are computed multiple times while keeping input data (e.g., a feature amount of user information and an LSH parameter) secret, and an inner product of the obtained vector and a random number vector is used as the index of a hash table.

CITATION LIST

Non Patent Literature

NPL 1: M. Sadegh Riazi, et al., "Sub-Linear Privacy-Preserving Near-Neighbor Search with Untrusted Server on Large-Scale Datasets" (arxiv.org/abs/1612.01835)

NPL 2: Alexander J. Titus, et al., "SIG-DB: leveraging homomorphic encryption to Securely Interrogate privately held Genomic DataBases" (doi.org/10.1371/journal.pcbi.1006454)

SUMMARY

Technical Problem

However, with the technique described in NPL 1, the user information and information related to the user information are not kept completely secret, and thus the user information may be guessed. Additionally, with the technique described in NPL 2, it is necessary to compute the LSH multiple times, which increases the computational amount and is therefore inefficient.

Accordingly, the present disclosure provides a secure authentication method and a secure authentication system that improve the secrecy of user information and information related to the user information, and furthermore improve processing speed.

Solution to Problem

To solve the above-described problem, one aspect of a secure authentication method according to the present disclosure is a secure authentication method for performing authentication processing while keeping an input secret. The secure authentication method includes: deriving a distributed Locality Sensitive Hashing (LSH) value by taking a first distributed feature amount and a distributed LSH parameter as inputs and using secret LSH that executes processing of the LSH while keeping the inputs secret, the distributed LSH value being an LSH value that is distributed, the first distributed feature amount being a feature amount of user information pertaining to a user and that is distributed using a secret distribution method, and the distributed LSH parameter being a parameter distributed through LSH; deriving a distributed hash value, which is a hash value that is distributed, taking the distributed LSH value derived and a distributed key that is a key for executing processing of a unidirectional function and that has been distributed, as inputs, and using a secret unidirectional function that executes the processing of the unidirectional function while keeping the inputs secret; decoding the distributed hash value derived into a hash value for which distribution through the secret distribution method has been reversed; selecting a set, among a plurality of sets, including a hash value that matches the hash value obtained from the decoding, using a secret hash table, which is a table storing the plurality of sets of a hash value as an index and a distributed feature amount as a data string in advance; computing a similarity between the distributed feature amount included in the set selected and the first distributed feature amount while keeping the similarity secret; deriving an authentication result of the user based on the similarity computed while keeping the authentication result secret; and outputting the authentication result derived.

Additionally, to solve the above-described problem, one aspect of a secure authentication system according to the present disclosure is a secure authentication system that performs authentication processing while keeping an input secret. The secure authentication system includes: a distributed LSH value deriver that derives a distributed LSH value, which is an LSH value that is distributed, by taking a first distributed feature amount and a distributed LSH parameter as inputs and using secret LSH that executes processing of the LSH while keeping the inputs secret, the first distributed feature amount being a feature amount of user information pertaining to a user and that is distributed using a secret distribution method, the distributed LSH parameter being a distributed parameter of the LSH; a distributed hash value deriver that, taking the distributed LSH value derived by the distributed LSH value deriver, and a distributed key that is a key for executing processing of a unidirectional function and that has been distributed, as inputs, derives a distributed hash value, the distributed hash value being a hash value that is distributed using a secret unidirectional function that executes processing of the unidirectional function while keeping the inputs secret and that is distributed; a decoder that decodes the distributed hash value derived by the distributed hash value deriver into a hash value for which distribution through the secret distribution method has been reversed; secret hash table storage that stores a secret hash table, the secret hash table being a table storing a plurality of sets of a hash value as an index and a distributed feature amount as a data string in advance; a distributed authentication result deriver that, using the secret hash table, selects a set, among the plurality of sets, including a hash value that matches the hash value obtained from the decoding, computes a similarity between the distributed feature amount included in the set selected and the first distributed feature amount while keeping the similarity secret, and derives an authentication result of the user based on the similarity computed while keeping the authentication result secret; and an outputter that outputs the authentication result derived by the distributed authentication result deriver.

Advantageous Effects

According to the secure authentication method and the secure authentication system of the present disclosure, the secrecy of user information and information related to the user information can be improved, and processing speed can be improved as well.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 10 is a sequence chart illustrating an example of details of processing performed in step S405 of FIG. 9.

FIG. 11 is a diagram illustrating an example of an LSH parameter according to the embodiment.

FIG. 12 is a diagram illustrating an example of LSH values according to the embodiment.

FIG. 13 is a diagram illustrating an example of a hash table.

FIG. 14 is a diagram illustrating an example of a distributed feature amount according to the embodiment.

FIG. 15 is a diagram illustrating an example of a secret hash table according to the embodiment.

DESCRIPTION OF EMBODIMENTS

Findings Leading to Present Disclosure

Figure 1:
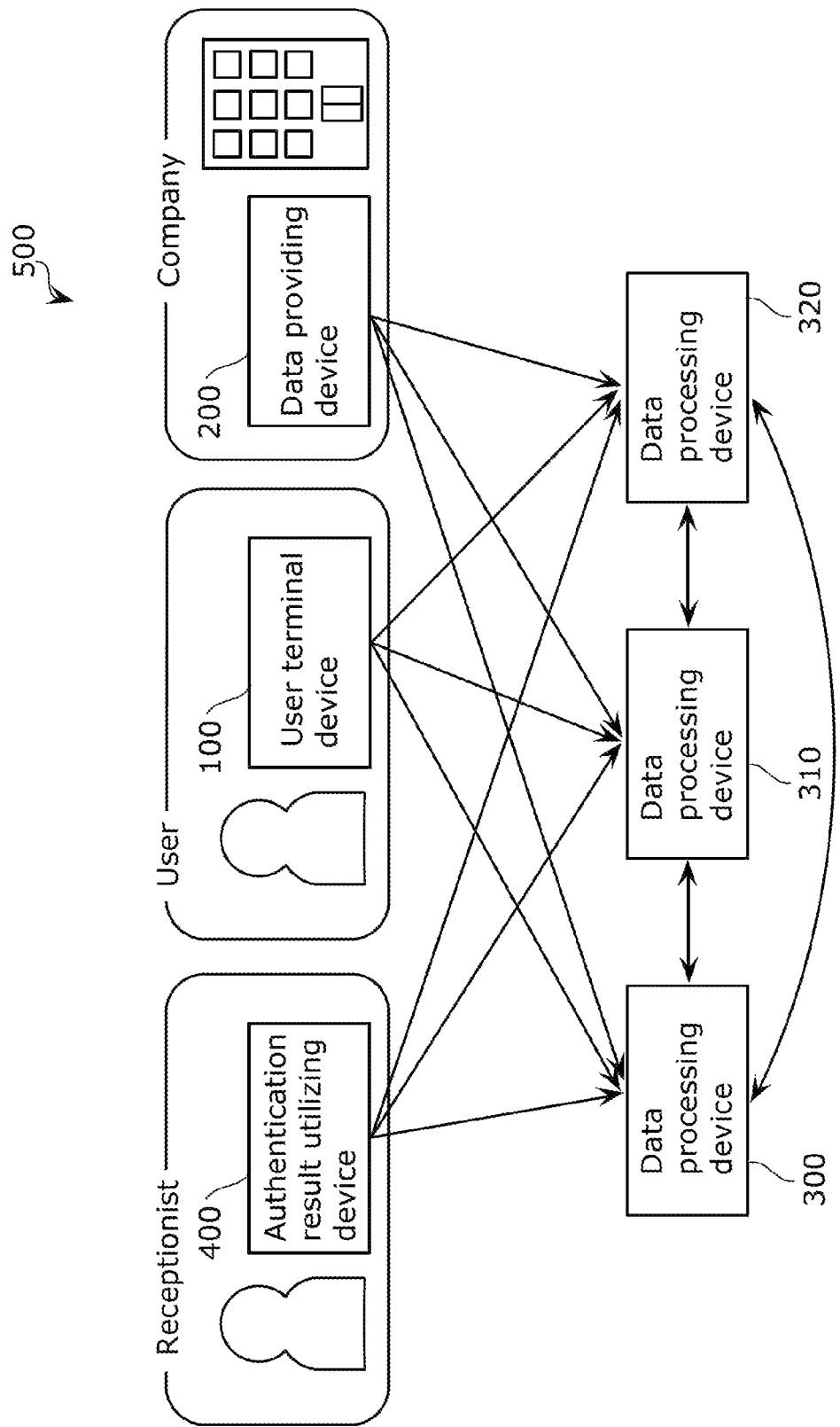
FIG. 1 is a diagram illustrating an example of the overall configuration of a secure authentication system according to an embodiment.

In recent years, user authentication using machine learning (e.g., biometric authentication) is being utilized in a variety of situations. For example, biometric authentication includes authentication using not only a user's face image, but also information about the user's physical features such as a fingerprint image or an iris image, information about the user's behavioral features such as gait or behavioral history, or information about features of the user's possessions such as document information.

There are two types of authentication methods for users: one-to-one authentication and one-to-N authentication. One-to-one authentication is a method of authenticating a user by reading an ID of the person to be verified from an ID card or the like, for example, and determining whether user information registered in association with that ID matches the user information that has been sensed. On the other hand, one-to-N authentication is a method of authenticating a user by determining, from a database (e.g., a table) that contains a plurality of user IDs and user information associated with each of those IDs, whether sensed user information corresponds to the user information associated with an ID, or whether the sensed user information does not correspond to any user information stored in the database.

Compared to one-to-one authentication, which only requires a determination as to whether or not a single instance of user information matches, one-to-N authentication requires a comparison with all the user information registered in advance in the database, which involves more processing and makes the authentication processing more difficult. However, one-to-N authentication is more convenient because the user does not need to carry or present an ID card or the like.

An efficient method for implementing one-to-N authentication is to use a nearest neighbor search. This method computes the similarity between the feature amounts of a plurality of users' information (known as "user information") registered in a database in advance and a feature amount of user information sensed by sensors such as cameras, scanners, microphones, or the like for authentication (also called a "feature amount of user information for authentication"), and searches for the feature amount nearest (i.e., most similar) to the feature amount of user information for authentication from the database. If the similarity between the feature amount of the nearest neighbor and the feature amount of the user information for authentication is less than or equal to a threshold, the authentication fails, but if the similarity is higher than the threshold, the authentication succeeds.

A technique called Locality Sensitive Hashing (LSH) is used as a nearest neighbor search method (NPL 3: Piotr Indyk, et al., "Approximate nearest neighbors: Towards removing the curse of dimensionality" (www.cs.princeton.edu/courses/archive/spr04/cos598B/bib/IndykM-curse.pdf)) is used.

LSH is a technique for mapping close input values to the same hash value. When LSH is used in one-to-N authentication, the same hash value (called an "LSH value" hereinafter) is output when the feature amounts of similar user information are input to LSH, and thus a group of feature amounts of user information similar to the user information sensed for authentication can be efficiently retrieved from the database. Then, by computing the similarity between all the feature amounts included in the retrieved group of feature amounts and the feature amount of the user information sensed for authentication, the feature amount of the user information for authentication and the nearest neighbor feature amount can be found.

For a user to use such an authentication service, it is necessary for the user to send information about him/herself (i.e., user information) or a feature amount obtained from such information to a server. However, user information such as a face image is itself sensitive information and therefore must be protected. Additionally, attacks which infer original user information from feature amounts of the user information are known, and it is therefore necessary to protect information related to the user information, such as the feature amount, in addition to the user information.

There is thus a need for a technique for efficiently authenticating a user while keeping user information as well as information related to the user information secret.

A method that performs authentication processing using secure computation (NPL 4: Takashi Nishide, et al., "Multiparty computation for interval, equality, and comparison without bitdecomposition protocol" (www.iacr.org/archive/pkc2007/44500343/44500343.pdf)) is conceivable as a method for enabling computations to be performed while keeping data secret. Secure computation is a technique that makes it possible to keep the computation process and results secret from the entity that stores the data.

When secure computation is used, for example, data can be stored on a server managed by a third party, such as a cloud server, and any operation can be executed on the stored data. Because no third party can know the input data, computation process, or computation results, analysis processing of sensitive information, such as personal information, can be outsourced.

Additionally, as a technique for authenticating a user while keeping input data secret, NPL 1 discloses a technique for authenticating a user while keeping user information and information related to the user information secret by encrypting, and sending to a server, an LSH value derived by a user terminal device and a feature amount of the user information. However, with this technique, the user information and information related to the user information are not kept completely secret, and thus the user information may be guessed.

Additionally, as a method for computing LSH and searching a database while keeping input data secret, for example, NPL 2 discloses a technique in which LSH values are computed multiple times while keeping input data (e.g., a feature amount of user information and the LSH parameter) secret, and an inner product of the obtained vector and a random number vector is used as the index of a hash table. However, this method is not practical due to its huge computational amount.

After diligent examinations in light of the foregoing issue, the inventors found that by using LSH and a secret distribution method, and furthermore processing the LSH value obtained from the computation of LSH with a unidirectional function while keeping the LSH value secret, the secrecy of the user information can be improved and the processing speed can be increased. This makes it impossible to infer the original user information from the hash value, even if the hash value of the LSH value processed by the unidirectional function is leaked. Using LSH also reduces the computational amount of one-to-N authentication. Furthermore, using the secret distribution method improves the secrecy and processing efficiency.

As such, according to the secure authentication method and the secure authentication system of the present disclosure, the secrecy of user information and information related to the user information can be improved, and processing speed can be improved as well.

One aspect of the present disclosure is as follows.

A secure authentication method according to one aspect of the present disclosure is a secure authentication method for performing authentication processing while keeping an input secret. The secure authentication method includes: deriving a distributed Locality Sensitive Hashing (LSH) value by taking a first distributed feature amount and an encrypted LSH parameter as inputs and using secret LSH that executes processing of the LSH while keeping the inputs secret, the distributed LSH value being an LSH value that is encrypted and that is distributed, the first distributed feature amount being a feature amount of user information pertaining to a user and that is distributed using a secret distribution method, and the encrypted LSH parameter being a parameter encrypted through LSH; deriving a distributed hash value, which is a hash value that is encrypted and distributed, taking the distributed LSH value derived and a distributed key that is a key for executing processing of a unidirectional function and that has been encrypted and distributed, as inputs, and using a secret unidirectional function that executes the processing of the unidirectional function while keeping the inputs secret; decoding the distributed hash value derived into a hash value for which distribution through the secret distribution method has been reversed; selecting a set, among a plurality of sets, including a hash value that matches the hash value obtained from the decoding, using a secret hash table, which is a table storing the plurality of sets of a hash value as an index and a distributed feature amount as a data string in advance; computing a similarity between the distributed feature amount included in the set selected and the first distributed feature amount while keeping the similarity secret; deriving an authentication result of the user based on the similarity computed while keeping the authentication result secret; and outputting the authentication result derived.

Through this, in the secure authentication method, information aside from the hash value is distributed through the secret distribution method, and thus no information that can be used to infer the original user information, e.g., information related to the user information such as LSH values and feature amounts, is disclosed. As such, the secure authentication method improves the secrecy of the user information and the information related to the user information. Furthermore, the secret hash table is referenced using the hash value, and thus the authentication processing can be performed at low computational cost. As such, according to the secure authentication method, the secrecy of user information and information related to the user information can be improved, and processing speed can be improved as well.

In a secure authentication method according to one aspect of the present disclosure, the deriving of the authentication result of the user may include: extracting, as a second distributed feature amount, a distributed feature amount that, of the distributed feature amount included in the set selected, has a similarity with the first distributed feature amount that is highest; determining whether or not the similarity between the second distributed feature amount extracted and the first distributed feature amount is higher than a threshold; outputting a distributed numerical value indicating that authentication of the user is successful as the authentication result when the similarity is determined to be higher than the threshold; and outputting a distributed numerical value indicating that authentication of the user is unsuccessful as the authentication result when the similarity is determined to be no higher than the threshold, when the similarity is determined to be no higher than the threshold.

Through this, in the secure authentication method, the distributed feature amount having the highest similarity to the first distributed feature amount, which is the feature amount of the user information for authentication, can be extracted, which reduces the computational amount. Additionally, in the secure authentication method, whether or not a user is the user him/herself can be determined based on the threshold, and thus even if, for example, error arises in the feature amount due to sensing conditions or the like, the feature amount can be determined to be the same as the feature amount of the pre-registered user him/herself.

In a secure authentication method according to one aspect of the present disclosure, the feature amount may be one of a physical feature amount pertaining to a physical feature of the user, a behavioral feature amount pertaining to a behavioral feature of the user, or a possession feature amount pertaining to a possession of the user. The physical feature amount may include a feature amount of at least one of the following information: a retina image, an iris image, a fingerprint image, a vein image, voice information, ear shape information, deoxyribonucleic acid (DNA) information, or a palm image. The behavioral feature amount may include a feature amount of at least one of the following information: handwriting, a keystroke, a gait, and a behavioral history. The possession feature amount may include a feature amount of at least one piece of information including document information, a memory, and a possession of the user.

Through this, in the secure authentication method, the feature amount to be used for the authentication can be selected as appropriate according to the design.

In a secure authentication method according to one aspect of the present disclosure, each of the first distributed feature amount and the distributed feature amount may include types of feature amounts that are distributed, and the computing of the similarity between the distributed feature amount included in the set selected and the first distributed feature amount may include computing, for each of the types of feature amounts, a similarity between the distributed feature amount and the first distributed feature amount.

Through this, authentication having higher accuracy and greater applicability is possible.

In a secure authentication method according to one aspect of the present disclosure, the distributed hash value may have randomness.

When the range of values which LSH can take on is small, the hash values of all values can be computed easily, and thus providing input randomness from the output makes it difficult to compute the original LSH value from the hash value. As such, according to the secure authentication method, the secrecy (also called the "security") of the LSH value and the user information is improved.

In a secure authentication method according to one aspect of the present disclosure, the data string may further include a distributed user ID which is a user ID that has been distributed.

Through this, in the secure authentication method, the user ID can be confirmed along with the user authentication, which improves the versatility.

In a secure authentication method according to one aspect of the present disclosure, the outputting of the authentication result may include outputting the authentication result derived and at least one of the distributed feature amount or the user ID included in the data string of the set selected.

Through this, the secure authentication method can use a variety of information pertaining to the user when using the authentication result, and can therefore provide more advanced services such as displaying the user ID along with the authentication results.

In a secure authentication method according to one aspect of the present disclosure, a user terminal device of the user may compute the feature amount from the user information which has been obtained through sensing, and derive the first distributed feature amount by encrypting and distributing, through the secret distribution method, the feature amount derived.

Through this, in the secure authentication method, the user can obtain the feature amount of the user information using a user terminal device, which eliminates the need to send user information, which itself is sensitive information, such as face images, to the outside. As such, according to the secure authentication method, the security of the user information is improved.

In a secure authentication method according to one aspect of the present disclosure, a user terminal device of the user may send the user information which has been obtained through sensing to a server that is trusted and does not leak information, and the server may derive the feature amount from the user information, and derive the first distributed feature amount by distributing, using the secret distribution method, the feature amount derived.

Through this, in the secure authentication method, the processing performed by the user terminal device can be reduced, which means that the user terminal device requires fewer resources.

In a secure authentication method according to one aspect of the present disclosure, the first distributed feature amount may be derived by a computing device that derives the authentication result of the user, a user terminal device of the user may send distributed user information to the computing device, the distributed user information being the user information obtained by sensing and having been distributed through the secret distribution method, and the computing device may derive the first distributed feature amount from the distributed user information.

Through this, in the secure authentication method, there is no need to prepare a trusted server, and there is furthermore no risk of information leaking from a trusted server, which makes it possible to safely compute the feature amount.

In a secure authentication method according to one aspect of the present disclosure, the distributed LSH parameter may be sent to a computing device that derives the authentication result of the user, and the computing device may derive the distributed LSH value using the secret LSH, taking the first distributed feature amount and the distributed LSH parameter as inputs.

Through this, the leaking of LSH parameters, which are assets of the service provider (e.g., a company having a data providing device), can be prevented.

In a secure authentication method according to one aspect of the present disclosure, the LSH may be SimHash.

In a secure authentication method according to one aspect of the present disclosure, the LSH may be MinHash.

In a secure authentication method according to one aspect of the present disclosure, the unidirectional function may be Advanced Encryption Standard (AES).

In a secure authentication method according to one aspect of the present disclosure, the unidirectional function may be Secure Hash Algorithm (SHA) or Message Digest 5 (MD5).

In a secure authentication method according to one aspect of the present disclosure, the unidirectional function may be ElGamal encryption, Rivest-Shamir-Adleman (RSA) encryption, or elliptic curve encryption.

A secure authentication system according to one aspect of the present disclosure is a secure authentication system that performs authentication processing while keeping an input secret. The secure authentication system includes: a distributed LSH value deriver that derives a distributed LSH value, which is an LSH value that is encrypted and distributed, by taking a first distributed feature amount and an encrypted LSH parameter as inputs and using secret LSH that executes processing of the LSH while keeping the inputs secret, the first distributed feature amount being a feature amount of user information pertaining to a user and that is encrypted and that is distributed using a secret distribution method, the distributed LSH parameter being an encrypted parameter of the LSH; a distributed hash value deriver that, taking the distributed LSH value derived by the distributed LSH value deriver, and a distributed key that is a key for executing processing of a unidirectional function and that has been encrypted and distributed, as inputs, derives a distributed hash value, the distributed hash value being a hash value that is encrypted using a secret unidirectional function that executes processing of the unidirectional function while keeping the inputs secret and that is distributed; a decoder that decodes the distributed hash value derived by the distributed hash value deriver into a hash value for which distribution through the secret distribution method has been reversed; secret hash table storage that stores a secret hash table, the secret hash table being a table storing a plurality of sets of a hash value as an index and a distributed feature amount as a data string in advance; a distributed authentication result deriver that, using the secret hash table, selects a set, among the plurality of sets, including a hash value that matches the hash value obtained from the decoding, computes a similarity between the distributed feature amount included in the set selected and the first distributed feature amount while keeping the similarity secret, and derives an authentication result of the user based on the similarity computed while keeping the authentication result secret; and an outputter that outputs the authentication result derived by the distributed authentication result deriver.

Through this, in the secure authentication system, information aside from the hash value is distributed through the secret distribution method, and thus no information that can be used to infer the original user information, e.g., information related to the user information such as LSH values and feature amounts, is disclosed. As such, the secure authentication system improves the secrecy of the user information and the information related to the user information. Furthermore, the secret hash table is referenced using the hash value, and thus the authentication processing can be performed at low computational cost. As such, according to the secure authentication system, the secrecy of user information and information related to the user information can be improved, and processing speed can be improved as well.

Note that the following embodiments describe specific examples of the present disclosure. The numerical values, shapes, constituent elements, steps, orders of steps, and the like in the following embodiments are merely examples, and are not intended to limit the present disclosure. Additionally, of the constituent elements in the following embodiments, constituent elements not denoted in the independent claims, which express the broadest interpretation, will be described as optional constituent elements. Additionally, the drawings are not necessarily exact illustrations. Configurations that are substantially the same are given the same reference signs in the drawings, and redundant descriptions may be omitted or simplified.

Additionally, variations on the embodiments conceived by one skilled in the art, other embodiments implemented by combining constituent elements from parts of each embodiment in all of the embodiments, and the like, for as long as they do not depart from the essential spirit thereof, fall within the scope of the present disclosure.

Embodiment

A secure authentication method and a secure authentication system according to the present embodiment will be described hereinafter with reference to the drawings.

1. Overview of Secure Authentication System

First, an overview of the secure authentication system according to the present embodiment will be described. The secure authentication system according to the present embodiment is a system for performing user authentication processing while keeping user information secret. More specifically, the secure authentication system is a system that uses Locality Sensitive Hashing (LSH), which is one approximate nearest neighbor search method, to extract user information having the same hash value as user information to be authenticated from a plurality of pieces of user information pre-registered in a hash table, and performs user authentication processing based on a similarity between the extracted user information and the user information to be authenticated, while keeping the user information secret. Here, "secret" or "making secret" refers to being distributed through a secret distribution method, and will be referred to as "distributing" or "distributed" hereinafter. Furthermore, "encryption" or "encrypted" refers to encryption using some encryption technique aside from the secret distribution method. The encryption technique used is not particularly limited.

1.1. Configuration of Secure Authentication System

The configuration of the secure authentication system according to the present embodiment will be described next with reference to FIG. 1.

FIG. 1 is a diagram illustrating an example of the overall configuration of a secure authentication system according to the present embodiment. As illustrated in FIG. 1, secure authentication system 500 includes, for example, user terminal device 100, data providing device 200, three data processing devices 300, 310, and 320, and authentication result utilizing device 400. Communication between the devices may be a wired Internet line, wireless communication, dedicated communication, or the like.

User terminal device 100 is a terminal device owned by a user to be authenticated. Data providing device 200 is a device owned by a company or an organization that provides a secure authentication service. Data processing devices 300, 310, and 320 are devices which perform computational processing for obtaining a feature amount of user information sent from user terminal device 100, as well as information of parameters and the like required for processing and sent from data providing device 200, and deriving an authentication result while keeping the obtained information secret. Here, each of data processing devices 300, 310, and 320 is a single cloud server or a device included in a single cloud server. Authentication result utilizing device 400 is a device owned by a company or an organization that uses the authentication result of the user. Authentication result utilizing device 400 is installed at, for example, a reception desk or the like of a facility used by the user.

In secure authentication system 500, for example, data providing device 200 sends the LSH parameter, a key required to compute a unidirectional function, and a threshold used for the user authentication processing (more specifically, processing for deriving the authentication result) to three cloud servers, i.e., data processing devices 300, 310, and 320. Note that data providing device 200 sends the key secretly to data processing devices 300, 310, and 320. The LSH parameter and the threshold are sent having been distributed through the secret distribution method.

Additionally, in secure authentication system 500, for example, when the user uses the secure authentication service, user terminal device 100 sends a feature amount of the user information in secret to data processing devices 300, 310, and 320, which are three cloud servers (these will also be called "three cloud servers" hereinafter).

By communicating with each other, the three cloud servers derive authentication results while keeping the data secret, with each cloud server using data obtained by the other cloud servers. The authentication results obtained by the three cloud servers are then sent to authentication result utilizing device 400 while keeping the authentication results secret.

Note that there may be at least one user terminal device 100, at least one data providing device 200, and at least one authentication result utilizing device 400.

Furthermore, although secure authentication system 500 includes three data processing devices in the example illustrated in FIG. 1, it is sufficient for the system to include at least two data processing devices. To briefly explain the reason, the secret sharing method used in the present embodiment requires at least two pieces of distributed data to reverse the distribution of the data distributed through the secret distribution method and decode the distributed data into the data from before the distribution through the secret distribution method (i.e., the original data). In other words, with the secret distribution method, the original data cannot be decoded from a single piece of distributed data. Accordingly, secure authentication system 500 can reverse the distribution through the secret distribution method as long as two data processing devices are provided.

As described above, the data distributed through the secret distribution method cannot be decoded into the original data with only a single piece of distributed data, and thus the processing performed by each data processing device is performed with the data remaining secret, and the authentication results derived from that processing are also kept secret through the secret distribution method. As such, at least two secure authentication results are necessary to obtain a decoded authentication result.

Note that the communication among the devices constituting secure authentication system 500 need not be real-time communication. For example, user terminal device 100 may collect a given number of pieces of user information from sensing or request commands for secure authentication processing and then transmit those items to the three data processing devices 300, 310, and 320 at once.

Configurations of secure authentication system 500 will be described hereinafter, but secure authentication system 500 illustrated in FIG. 1 is merely an example, and the secure authentication system of the present disclosure is not limited thereto.

1.2 User Terminal Device

Figure 2:
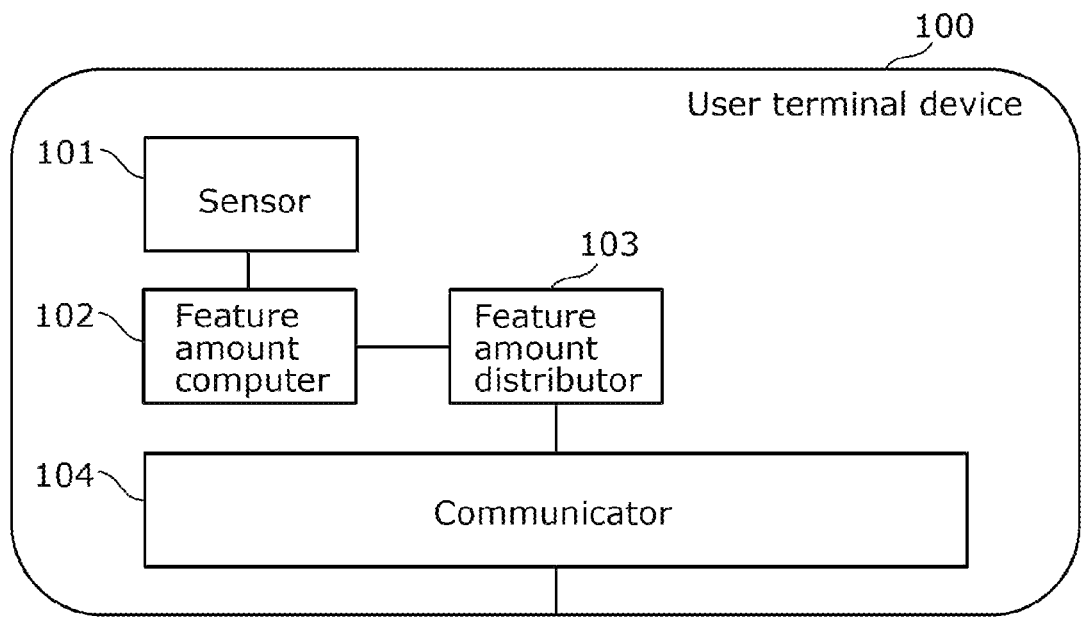
FIG. 2 is a diagram illustrating an example of the configuration of a user terminal device according to the embodiment.

FIG. 2 is a diagram illustrating an example of the configuration of user terminal device 100 according to the present embodiment. User terminal device 100 includes, for example, sensor 101, feature amount computer 102, feature amount distributor 103, and communicator 104. User terminal device 100 is, for example, a terminal device owned by a user to be authenticated. User terminal device 100 is implemented in a computer or mobile terminal including, for example, a processor (microprocessor), memory, sensors, a communication interface, and the like.

For example, user terminal device 100 senses user information pertaining to a user, computes a feature amount of the sensed user information, distributes the computed feature amount using a secret distribution method, and sends the feature amount that has been distributed (called a "distributed feature amount" to data processing devices 300, 310, and 320. For example, sensor 101 senses the user information, feature amount computer 102 computes the feature amount of the sensed user information, feature amount distributor 103 distributes the computed feature amount using the secret distribution method, and communicator 104 sends the feature amount that has been distributed to data processing devices 300, 310, and 320.

Then, user terminal device 100 may request authentication results corresponding to the computed feature amount from data processing devices 300, 310, and 320, obtain the authentication results from data processing devices 300, 310, and 320 with the authentication results remaining secret, and use a service in secure authentication system 500. At this time, user terminal device 100 decodes and uses the obtained authentication results.

1.2.1 Sensor

Sensor 101 is configured including one or more measurement devices, which are sensors, for sensing information necessary for authenticating the user. The information necessary for authenticating the user is, in other words, information for identifying the user from other users, e.g., information pertaining to a feature of the user him/herself or information pertaining to a feature of the user's behavior (also called "information of the user" hereinafter).

The information sensed by sensor 101 is used to authenticate the user. For example, information pertaining to a feature of the user him/herself is information pertaining to a physical feature of the user. The information pertaining to a physical feature of the user may be, for example, information pertaining to parts of the body such as the face, ears, or palms, or information pertaining to elements based on parts of the body such as veins, voiceprints, fingerprints, retina, iris, deoxyribonucleic acid (DNA), or the like. This information can be image data, voice data, or character string data such as numerical values. For example, the information pertaining to a physical feature of the user is a face image, a retina image, an iris image, a fingerprint image, a vein image, voice information, ear shape information, DNA information, a palm image, or the like.

Additionally, the information sensed by sensor 101 may be information pertaining to behavior of the user (called a "behavioral feature" hereinafter). For example, the information pertaining to a behavioral feature of the user is handwriting, a keystroke, information pertaining to a user's habits such as gait, or information pertaining to a behavioral history. The information pertaining to the behavioral history may be, for example, location information obtained by Global Positioning System (GPS), log information indicating a history of the user's operation of an electric device or a moving object such as a vehicle, the user's purchase history information for products and so on, or the like.

The log information may be various types of information obtained or measured in association with, for example, steering operations, acceleration operations, braking operations, operations for shifting gears, or the like when a user operates a vehicle, and may be, for example, information that associates a displacement amount, speed, acceleration, or the like with a time of operation for movement of the vehicle.

The information sensed by sensor 101 may, for example, be private data, which is personal matters that the user does not want others to know. For example, the private data may be document information, a memory, or information pertaining to a possession that the user owns.

1.2.2 Feature Amount Computer

Feature amount computer 102 computes a feature amount from the information of the user (also called "user information" hereinafter) obtained by sensor 101. The feature amount computed by feature amount computer 102 can be expressed as a vector containing a plurality of components.

The feature amount is one of, for example, a feature amount computed from the information pertaining to a physical feature of the user (also called a "physical feature amount" hereinafter), a feature amount computed from the information pertaining to a behavioral feature of the user (also called a "behavioral feature amount") hereinafter, or a feature amount computed from the information pertaining to a possession owned by the user (also called a "possession feature amount" hereinafter).

For example, the physical feature amount includes a feature amount of at least one piece of information including the retina image, the iris image, the fingerprint image, the vein image, the voice information, the ear shape information, the DNA information, and the palm image. Additionally, for example, the behavioral feature amount includes a feature amount of at least one piece of information including handwriting, keystrokes, gait, and the behavioral history, and the possession feature amount includes a feature amount of at least one piece of information including document information, a memory, and a possession of the user.

Note that when the user information is a face image of the user, the feature amount is the primary component of characteristic parameters in the face image, for example. The feature amount may be expressed, for example, as a vector containing characteristic parameters related to the position, area, or width of a given region of the face image of the user. Additionally, when the feature amount is the information pertaining to a behavioral history of the user, for example, the feature amount may be expressed by vectors that include, as components (e.g., coefficients of each term when expressed as a polynomial expression), a trend in an element corresponding to the time axis, from the history information.

Note that the feature amount extracted from the user information obtained by sensor 101 can itself be private data. The feature amount is a vector having d elements for a given d (where d is a natural number), and is data such as {1, 2, 3, 4, 5}, for example.

1.2.3 Feature Amount Distributor

Feature amount distributor 103 distributes and makes secret the feature amount computed by feature amount computer 102, through a predetermined method. Feature amount distributor 103 creates a feature amount that has been distributed (also called a "distributed feature amount" hereinafter) by distributing the feature amount using a method in which data processing devices 300, 310, and 320 can perform prediction processing using the feature amount still in a distributed state, e.g., the Shamir (2,3) threshold secret distribution method (NPL 5: Adi Shamir, "How to Share a Secret" (cs.jhu.edu/~sdoshi/crypto/papers/shamir-turing/pdf)).

The secret distribution method is a technique for generating a plurality of pieces of distributed information from secret information. The distributed information is created in such a way that the secret information can be recovered from a predetermined combination, but not from other combinations. The predetermined combination can take on a variety of structures, and those structures are called "access structures".

Although there are a variety of access structures, a threshold-type access structure will be described briefly here as a typical access structure. The threshold-type access structure is expressed by two parameters, namely a number n of the pieces of distributed information to be generated, and a threshold t (t n). The secret information can be recovered from at least t pieces of the distributed information, but not from fewer than t pieces of the distributed information.

Secret distribution methods with a threshold-type access structure include, for example, the Shamir (2,3) threshold secret distribution method mentioned above, which includes distribution processing for generating three pieces of distributed information with the secret information as input, and recovery processing for recovering the secret information from two or more pieces of the distributed information.

Modulo p used in the distribution processing is determined in advance by the system and held by feature amount distributor 103. FIG. 14 is a diagram illustrating an example of the distributed feature amount according to the present embodiment.

1.2.4 Communicator

Communicator 104 communicates with the plurality of (e.g., three) data processing devices 300, 310, and 320. Communicator 104 sends, to data processing devices 300, 310, and 320, the feature amounts created and distributed by feature amount distributor 103 (what are known as the "distributed feature amounts").

After receiving the distributed feature amounts, the plurality of (e.g., three) data processing devices 300, 310, and 320 use the distributed feature amounts in a secret state to execute pre-registration processing and authentication processing. This will be described in detail later.

1.3 Data Providing Device

Data providing device 200 will be described next. Data providing device 200 is a device owned by a company or an organization that provides a secure authentication service. Data providing device 200 is a device for providing, to data processing devices 300, 310, and 320, the LSH parameter, a threshold used in the user authentication processing, and the key necessary for computing a unidirectional function, for example.

Figure 3:
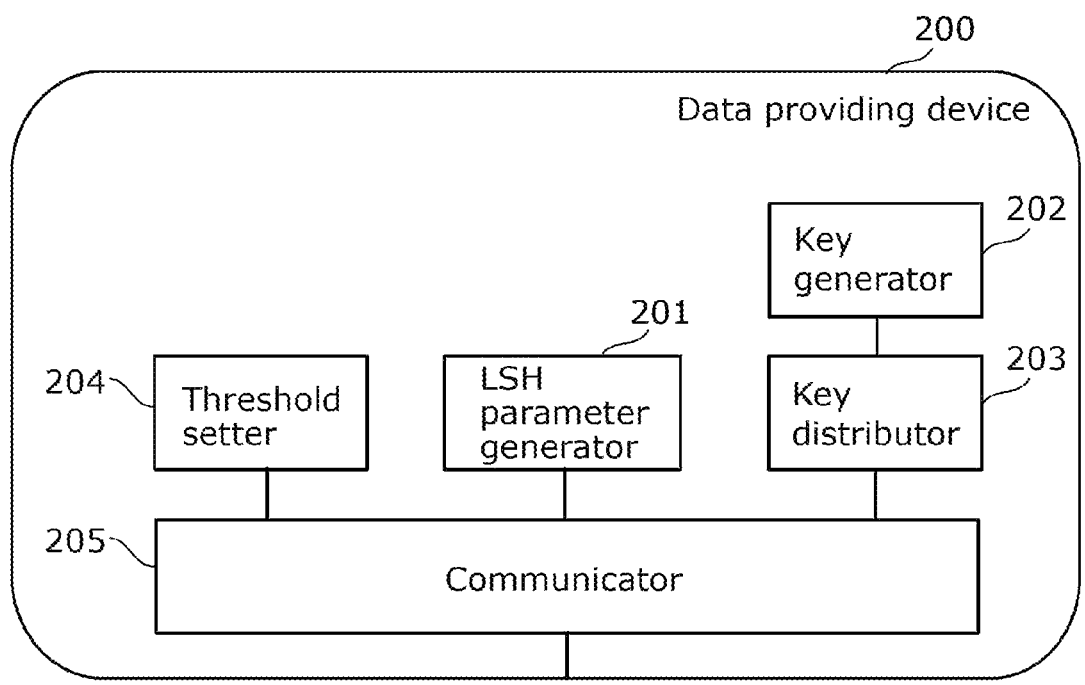
FIG. 3 is a diagram illustrating an example of the configuration of a data providing device according to the embodiment.

FIG. 3 is a diagram illustrating an example of the configuration of data providing device 200 according to the present embodiment. Data providing device 200 includes, for example, LSH parameter generator 201, key generator 202, key distributor 203, threshold setter 204, and communicator 205.

Data providing device 200 creates the LSH parameter for accurately authenticating the user, distributes the created LSH parameter through the secret distribution method, and sends the distributed LSH parameter to the three data processing devices 300, 310, and 320. The LSH parameter is set, for example, so that the same LSH value is derived from the feature amount of the same person's face image using LSH. Additionally, data providing device 200 generates a key for executing processing of a unidirectional function that does not leak user information, distributes the generated key using the secret distribution method, and sends the distributed encryption key (hereinafter referred to as a "distributed key") to the three data processing devices 300, 310, and 320, respectively.

1.3.1 LSH Parameter Generator

LSH parameter generator 201 generates the LSH parameter necessary for performing authentication using LSH, and sends the LSH parameter to communicator 205.

FIG. 11 is a diagram illustrating an example of the LSH parameter according to the present embodiment. FIG. 12 illustrates a formula for computing an LSH value using SimHash, and an example of the LSH value, according to the present embodiment. As illustrated in FIG. 12, in the case of, for example, LSH using a hash function called SimHash, the LSH value of a feature amount is computed by computing an inner product with any given n vectors, and checking whether each inner product value is at least 0. If the inner product value is at least 0, the value is set to 1, and if less than 0, to 0, which gives m {0, 1}, i.e., an m-bit value. This m-bit value is taken as the LSH value. The LSH parameter illustrated in FIG. 11 is a vector in LSH using SimHash when m is set to 3.

1.3.2 Key Generator

Key generator 202 generates a key used to execute the processing of the unidirectional function. For example, when using the Advanced Encryption Standard (AES) (NPL 6: Joan Daemen and Vincent Rijmen, "AES Proposal: Rijndael" (csrc.nist.gov/csrc/media/projects/cryptographic-standards-and-guidelines/documents/aes-development/rijndael-ammended.pdf)) as the unidirectional function, key generator 202 generates a 128-bit, 192-bit, or 256-bit value as the encryption key in order to securely achieve unidirectionality.

1.3.3 Key Distributor

Key distributor 203 distributes the encryption key created by key generator 202 through the secret distribution method and sends the distributed key to communicator 205.

1.3.4 Threshold Setter

Threshold setter 204 sets a threshold used in the user authentication processing, distributes the set threshold through the secret distribution method, and sends the distributed threshold to communicator 205. When data processing devices 300, 310, and 320 perform the user authentication processing, if a similarity between a feature amount of the user information (a first distributed feature amount) and a distributed feature amount having the highest similarity among distributed feature amounts pre-registered in a server is at least the threshold set by threshold setter 204, the user is determined to be a user registered in advance, and is authenticated. However, if the similarity is less than or equal to the threshold, the user is determined not to be a user registered in advance, and the user is rejected.

1.3.5 Communicator

Communicator 205 communicates with data processing devices 300, 310, and 320. Communicator 205 sends, to the plurality of (here, three) data processing devices 300, 310, and 320, the distributed LSH parameter created by LSH parameter generator 201, the distributed key created by key distributor 203, and the distributed threshold set by threshold setter 204.

1.4 Data Processing Devices

The data processing devices will be described next. Data processing devices 300, 310, and 320 are cloud servers, for example. In secure authentication system 500, it is sufficient for at least two data processing devices 300 to be provided.

In the present embodiment, the three data processing devices 300, 310, and 320 communicate with each other to perform the authentication processing while keeping the input secret, and send the result to authentication result utilizing device 400.

More specifically, data processing devices 300, 310, and 320 take the first distributed feature amount, which is the feature amount of the user information, and the distributed LSH parameter, which is the LSH parameter that has been distributed, as inputs, and computes a distributed LSH value using secret LSH, which executes the processing of LSH while keeping the input secret.

Furthermore, data processing devices 300, 310, and 320 take the distributed LSH value and the distributed key as inputs; using a secret unidirectional function that executes the processing of the unidirectional function while keeping the inputs secret, compute a distributed hash value; and decode the distributed hash value into a hash value in which the distribution through the secret distribution method has been reversed.

Then, data processing devices 300, 310, and 320 reference a secret hash table stored in secret hash table storage 306, using the obtained hash value as an index. The secret hash table stores a plurality of sets of a hash value as an index and the distributed feature amount as a data string in advance.

When performing the pre-registration processing for the user information, data processing devices 300, 310, and 320 store the distributed feature amount sent from user terminal device 100 in the data string of the secret hash table, using the obtained hash value as an index.

Additionally, when performing the user authentication processing, data processing devices 300, 310, and 320 select, from the plurality of sets stored in the secret hash table, a set including a hash value matching the decoded hash value; compute a similarity between the distributed feature amount included in the selected set and the distributed feature amount of the user sent from user terminal device 100 (called the "first distributed feature amount"), and derive an authentication result for the user based on the computed similarity while keeping the authentication result secret. For example, data processing devices 300, 310, and 320 extract the distributed feature amount having the highest similarity to the first distributed feature amount as a second distributed feature amount. Then, data processing devices 300, 310, and 320 determine whether or not a similarity between the extracted second distributed feature amount and the first distributed feature amount is higher than a threshold, authenticating the user as a pre-registered user him/herself if the similarity is higher than the threshold, and rejecting the user as a pre-registered user him/herself if the similarity is less than or equal to the threshold.

Figure 4:
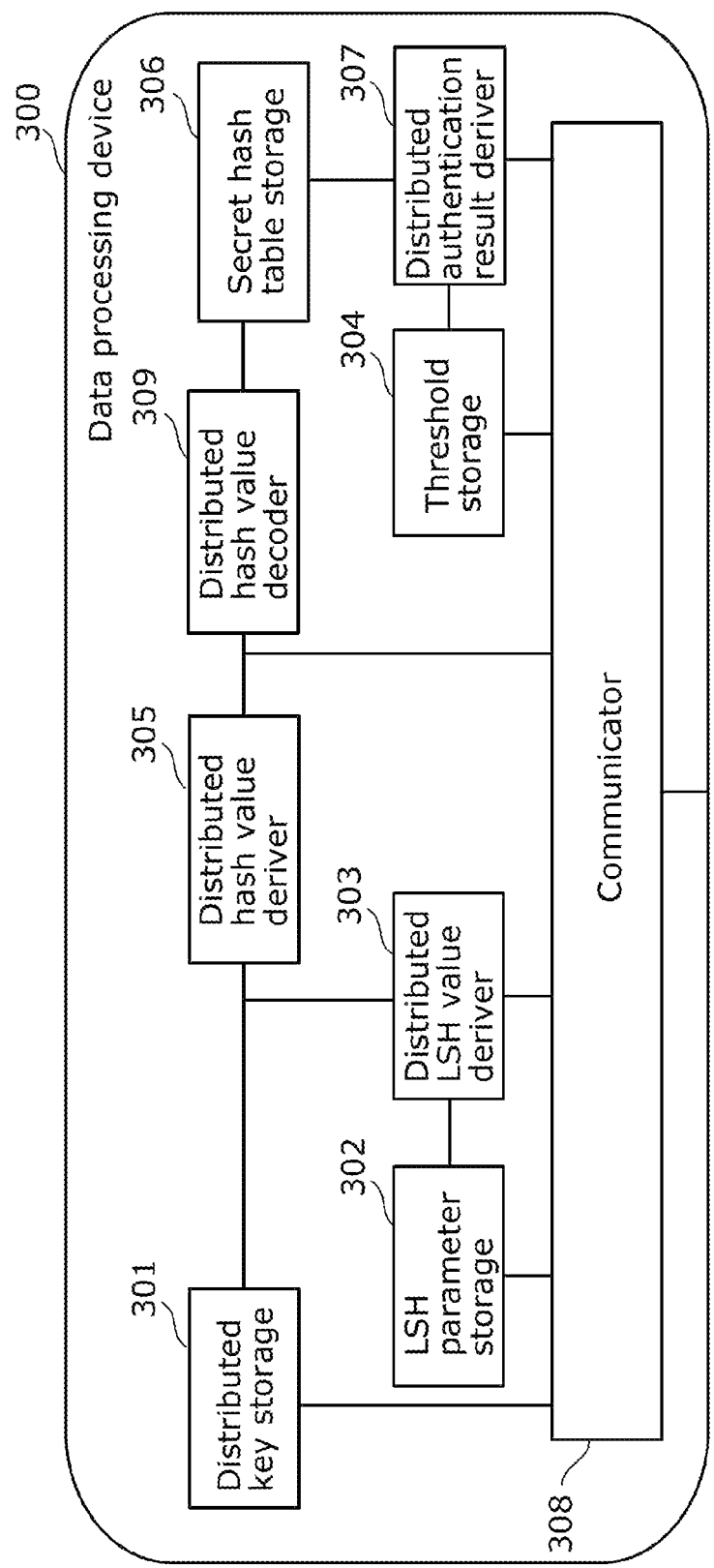
FIG. 4 is a diagram illustrating an example of the configuration of a data processing device according to the embodiment.

FIG. 4 is a diagram illustrating an example of the configuration of data processing device 300. Data processing device 300 includes distributed key storage 301, LSH parameter storage 302, distributed LSH value deriver 303, threshold storage 304, distributed hash value deriver 305, secret hash table storage 306, distributed authentication result deriver 307, communicator 308, and distributed hash value decoder 309.

Note that data processing devices 310 and 320 have the same configuration as data processing device 300.

1.4.1 Distributed Key Storage

Distributed key storage 301 receives and stores the distributed key sent from data providing device 200 and distributed through the secret distribution method.

1.4.2 LSH Parameter Storage

LSH parameter storage 302 receives and stores the distributed LSH parameter sent from data providing device 200.

1.4.3 Distributed LSH Value Deriver

Using the distributed feature amount sent from user terminal device 100 and the distributed LSH parameter stored in LSH parameter storage 302, distributed LSH value deriver 303 derives an LSH value of the distributed feature amount using secret LSH, which executes the processing of LSH without decoding the distributed feature amount, i.e., derives a distributed LSH value. Distributed LSH value deriver 303 then sends the derived distributed LSH value to distributed hash value deriver 305.

LSH can be computed using SimHash (NPL 7: Moses S. Charikar, "Similarity Estimation Techniques from Rounding Algorithms" (www.cs.princeton.edu/courses/archive/spring04/cos598B/bib/CharikarEstim.pdf)) or MinHash (NPL 8: Ping Li, et al., "b-Bit Minwise Hashing" (arxiv.org/pdf/0910.3349.pdf)). As described above, in SimHash, n vectors having random values in the same number of dimensions as the feature amount are created as LSH parameters. An inner product of the n vectors and the feature amount is computed, and it is determined whether or not the inner product value is at least 0. The n {0,1} obtained in this manner is used as the LSH value.

1.4.4 Threshold Storage

Threshold storage 304 receives and stores the threshold used in the user authentication processing, sent from data providing device 200.

1.4.5 Distributed Hash Value Deriver

Distributed hash value deriver 305 uses the distributed LSH value derived by distributed LSH value deriver 303 and the distributed key stored in distributed key storage 301, and derives a distributed hash value using the secret unidirectional function, which executes the processing of the unidirectional function while keeping the LSH value secret. Distributed hash value deriver 305 then sends the derived distributed hash value to distributed hash value decoder 309. The hash value is decoded and output, and send to secret hash table storage 306.

The unidirectional function may be a cryptographic hash function such as MD5 or Secure Hash Algorithm (SHA), a power function (NPL 9: Chao Ning, et al., "Constant-Rounds, Linear Multi-party Computation for Exponentiation and Modulo Reduction with Perfect Security" (eprint.iacr.org/2011/069.pdf)), or public key encryption such as AES or ElGamal encryption, RSA encryption, elliptic curve encryption, or the like.

For example, if a power function is used as the unidirectional function, $y = k^x \mod p$ is computed, where k is the distributed key, x is the distributed LSH value, and y is the output hash value. Note that p may be a different value from that of the modulo in the secret distribution method, but using the same value is more efficient.

When AES is used as the unidirectional function, "distributed key" refers to an AES key distributed through the secret distribution method. If a method that does not require key input is used as the unidirectional function, the distributed key may be empty.

1.4.6 Distributed Hash Value Decoder

Distributed hash value decoder 309 decodes the distributed hash value derived by distributed hash value deriver 305 into a hash value in which the distribution through the secret distribution method is reversed, and sends the decoded hash value to secret hash table storage 306.

1.4.7 Secret Hash Table Storage

Secret hash table storage 306 stores the secret hash table. The secret hash table is a table storing a plurality of sets of a hash value as an index and a distributed feature amount as a data string in advance.

During the pre-registration processing for the user information, secret hash table storage 306 references the secret hash table using the hash value decoded by distributed hash value decoder 309, and stores the distributed feature amount sent from user terminal device 100. For example, in the secret hash table, secret hash table storage 306 may store the distributed feature amount sent from user terminal device 100 in a data string that uses, as an index, the same hash value as the decoded hash value. Additionally, for example, in the secret hash table, secret hash table storage 306 may store the decoded hash value and the distributed feature amount sent from user terminal device 100 in association with each other, i.e., as a set.

During the user authentication processing, secret hash table storage 306 references the secret hash table using the hash value decoded by distributed hash value decoder 309, reads out all the distributed feature amounts stored in a row having a hash value that is the same as the decoded hash value as an index, and sends the distributed feature amounts to distributed authentication result deriver 307.

Additionally, for example, during the user authentication processing, secret hash table storage 306 may select, from the secret hash table, a set including a hash value matching the hash value decoded by distributed hash value decoder 309, and send the selected set to distributed authentication result deriver 307, or may send all the distributed feature amounts included in the selected set to distributed authentication result deriver 307.

The hash table will be described in detail here. FIG. 13 is a diagram illustrating an example of a hash table, and FIG. 15 is a diagram illustrating an example of the secret hash table according to the present embodiment. In this example, the user information of three people has been pre-registered.

The hash table illustrated in FIG. 13 is a plaintext hash table, in which the LSH value as the index and the feature amount as the data string are stored in association with each other. A plaintext hash table is undesirable from the perspective of the security of the user information, since the original user information can be derived from the LSH values. Accordingly, as illustrated in FIG. 15, in the present embodiment, security is improved by deriving the distributed hash value, which is the hash value of the distributed LSH value, using a secret unidirectional function, and using a hash value obtained by decoding the derived distributed hash value as an index. Additionally, in the present embodiment, the secret hash table stores the hash value as an index and the distributed feature amount as a data string in association with each other. In FIG. 15, the modulo p of the secret distribution method is, for example, 65519.

1.4.8 Distributed Authentication Result Deriver

Distributed authentication result deriver 307 receives, for example, the distributed feature amount sent from secret hash table storage 306, and derives an authentication result for the user based on a similarity between the received distributed feature amount and the distributed feature amount of the user to be authenticated (the first distributed feature amount).

For example, in the deriving of the authentication result for the user, distributed authentication result deriver 307 extracts, as the second distributed feature amount, the distributed feature amount, among the distributed feature amounts included in the selected set, that has the highest similarity with the first distributed feature amount sent from user terminal device 100, and determines whether or not the similarity between the extracted second distributed feature amount and the first distributed feature amount is higher than a threshold. Note that when computing the similarity, distributed authentication result deriver 307 may find a plaintext similarity, or may find a distributed value of the similarity distributed through a secret distribution method (also called a "distributed similarity").

Finally, distributed authentication result deriver 307 authenticates the user if the computed similarity is higher than the threshold, and rejects the user if the similarity is lower than the threshold.

A Euclidean similarity of two feature amounts (here, the first distributed feature amount and the second distributed feature amount), a squared Euclidean similarity, or a cosine similarity may be used as the similarity.

The authentication result may be a plaintext authentication result, or may be a distributed value of the authentication result distributed through a secret distribution method (also called a distributed authentication result).

Distributed authentication result deriver 307 sends the derived authentication result to communicator 308. The sent authentication result is ultimately sent to authentication result utilizing device 400. Note that the authentication result may be sent to user terminal device 100.

1.4.9 Communicator

Communicator 308 communicates with user terminal device 100 and data providing device 200. For example, communicator 308 receives the distributed LSH parameter from data providing device 200, the distributed threshold used in the authentication processing, and the key distributed through the secret distribution method, sends the distributed LSH parameter to LSH parameter storage 302, the distributed threshold to threshold storage 304, and the distributed key to distributed key storage 301.

Additionally, communicator 308 receives the feature amount distributed through the secret distribution method (called the "distributed feature amount") from user terminal device 100, and sends the distributed feature amount to distributed LSH value deriver 303 and distributed authentication result deriver 307.

1.5 Authentication Result Utilizing Device

The authentication result utilizing device will be described next. Authentication result utilizing device 400 is, for example, a terminal installed at a reception desk in an event venue or the like, and is implemented in a computer or mobile terminal including, for example, a processor (microprocessor), memory, sensors, a communication interface, and the like. In secure authentication system 500, it is sufficient for at least one authentication result utilizing device 400 to be provided.

In the present embodiment, authentication result utilizing device 400 receives the authentication result that has been distributed (also called the "distributed authentication result") from the three data processing devices 300, 310, and 320, reverses the distribution performed through the secret distribution method, and decodes the authentication result into a plaintext authentication result.

The distributed authentication result may be used, for example, to present information pertaining to the authentication result to a receptionist or the user, or may be used to open entry and exit gates to an event venue.

Figure 5:
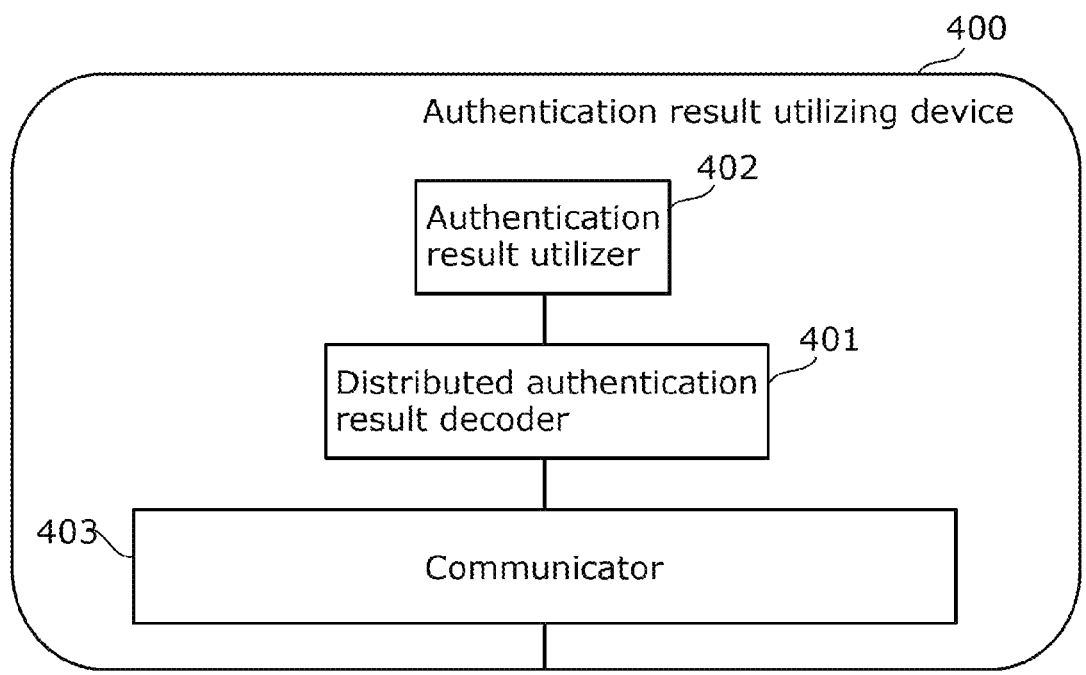
FIG. 5 is a diagram illustrating an example of the configuration of an authentication result utilizing device according to the embodiment.

FIG. 5 is a diagram illustrating an example of the configuration of authentication result utilizing device 400. Authentication result utilizing device 400 includes distributed authentication result decoder 401, authentication result utilizer 402, and communicator 403.

1.5.1 Distributed Authentication Result Decoder

Distributed authentication result decoder 401 decodes the distributed authentication result sent from data processing devices 300, 310, and 320. For example, distributed authentication result decoder 401 may decode the authentication result by reversing the distribution of the distributed authentication result through the secret distribution method. Distributed authentication result decoder 401 sends the decoded authentication result to authentication result utilizer 402.

1.5.2 Authentication Result Utilizer

Authentication result utilizer 402 utilizes the distributed authentication result decoded by distributed authentication result decoder 401. The distributed authentication result is used, for example, to present information pertaining to the authentication result to a receptionist or the user. Authentication result utilizer 402 can be implemented including, for example, a display, an audio output device, or another user interface.

For example, displaying information pertaining to the authentication result in a display of authentication result utilizing device 400 or the like can be given as an example of presenting the authentication result. When the user has been authenticated, the information pertaining to the authentication result may be, for example, information indicating that the user has been authenticated, such as "OK" or "authenticated", and user information pertaining to the user, such as a user ID or the like, may be included in addition to the stated information. Additionally, when the user has been rejected, the information pertaining to the authentication result may be, for example, information indicating that the user has been rejected, such as "NG" or "not authenticated".

The distributed authentication result may also be used, for example, to open entry and exit gates to an event venue. Authentication result utilizing device 400 may be connected to an entry or exit gate to an event venue, for example. In this case, having received the authentication result decoded by distributed authentication result decoder 401 (called the "authentication result"), authentication result utilizer 402 may perform control pertaining to operations such as opening an entry or exit gate once the user has been authenticated.

1.5.3 Communicator

Communicator 403 communicates with data processing devices 300, 310, and 320. Communicator 403 receives the authentication result distributed through the secret distribution method from data processing devices 300, 310, and 320 (called the "distributed authentication result") and sends the distributed authentication result to distributed authentication result decoder 401.

2. Operations of Secure Authentication System (Secure Authentication Method)

Next, an example of operations of secure authentication system 500 according to the present embodiment will be described. The operations of secure authentication system 500 include (1) an initialization phase of data providing device 200 sending, to data processing devices 300, 310, and 320, the key distributed through the secret distribution method (called the "distributed key"), the distributed LSH parameter, and the threshold used in the user authentication processing, (2) a registration phase of the user registering a feature amount of him/herself (i.e., the user information), and (3) an authentication phase of performing authentication using the user information currently obtained by the user.

2.1 Initialization Phase

Figure 6:
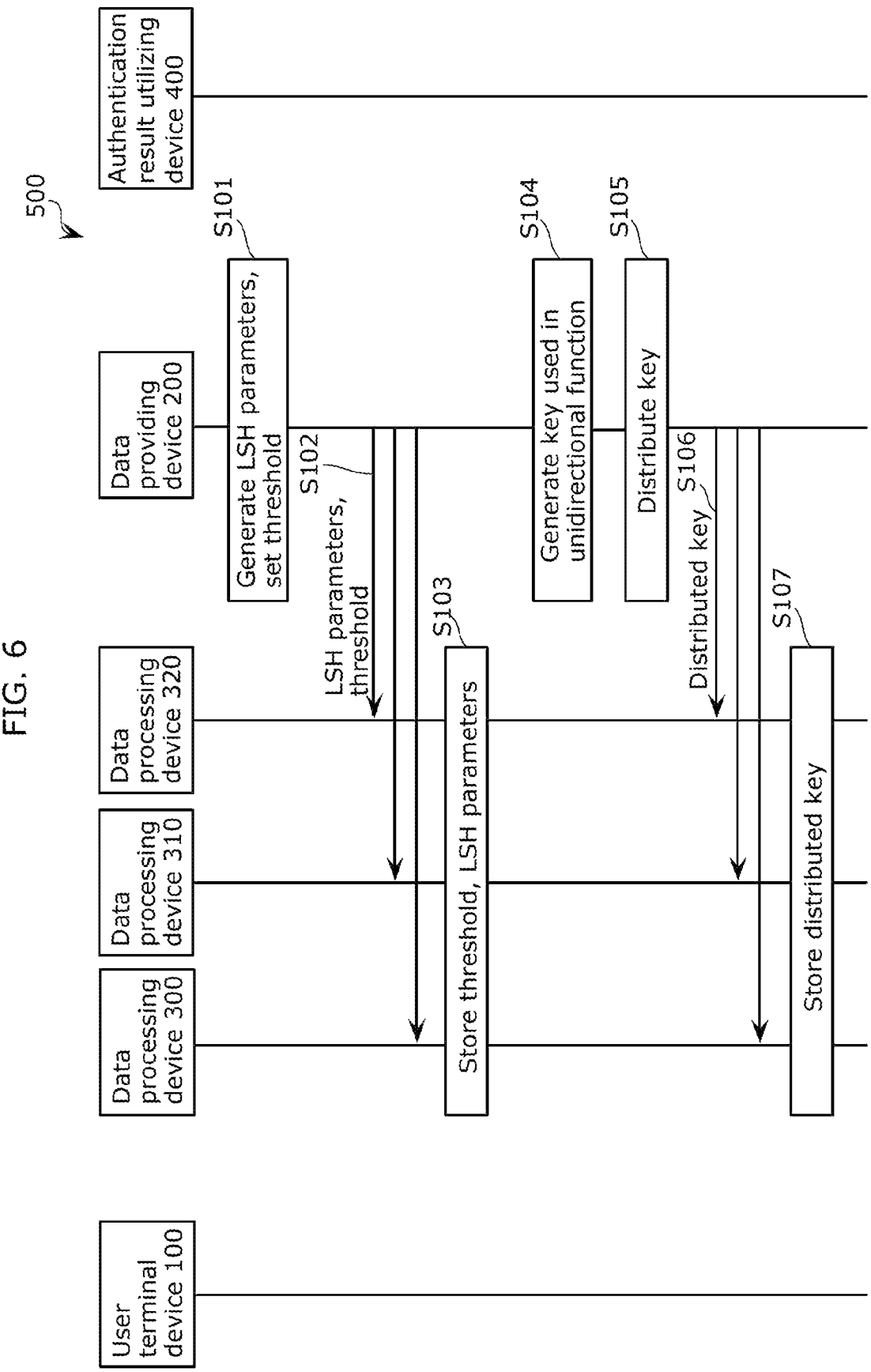
FIG. 6 is a sequence chart illustrating an example of operations of the secure authentication system in an initialization phase according to the embodiment.

First, operations of secure authentication system 500 in the initialization phase will be described. FIG. 6 is a sequence chart illustrating an example of operations of secure authentication system 500 in the initialization phase according to the present embodiment.

In the initialization phase, first, data providing device 200 generates the LSH parameter using LSH parameter generator 201, and sets the threshold to be used for the authentication using threshold setter 204 (S101).

Next, data providing device 200 sends the LSH parameter and the threshold to data processing devices 300, 310, and 320 (S102).

Next, data processing devices 300, 310, and 320 receive the LSH parameter and the threshold sent from data providing device 200, store the received LSH parameter in LSH parameter storage 302, and store the threshold in threshold storage 304 (S103).

Next, data providing device 200 generates the key to be used in the processing of the unidirectional function using key generator 202 (S104).

Next, data providing device 200 distributes the key generated in the process of step S104 through the secret distribution method using key distributor 203 (S105).

Next, data providing device 200 sends the key distributed in the process of step S105 (called the "distributed key") to data processing devices 300, 310, and 320 (S106).

Next, data processing devices 300, 310, and 320 receive the distributed key sent from data providing device 200, and store the distributed key in distributed key storage 301 (S107).

Through this, in the initialization phase, data providing device 200 generates the LSH parameter used in the processing of LSH, sets the distributed key used in the processing of the unidirectional function, and sends the LSH parameter and the distributed key to data processing devices 300, 310, and 320. As a result, when the distributed feature amount is sent from user terminal device 100, data processing devices 300, 310, and 320 can receive that distributed feature amount and perform user registration processing (operations in the registration phase, described below) and user authentication processing (operations in the authentication phase, described below).

2.2 Registration Phase

Figure 7:
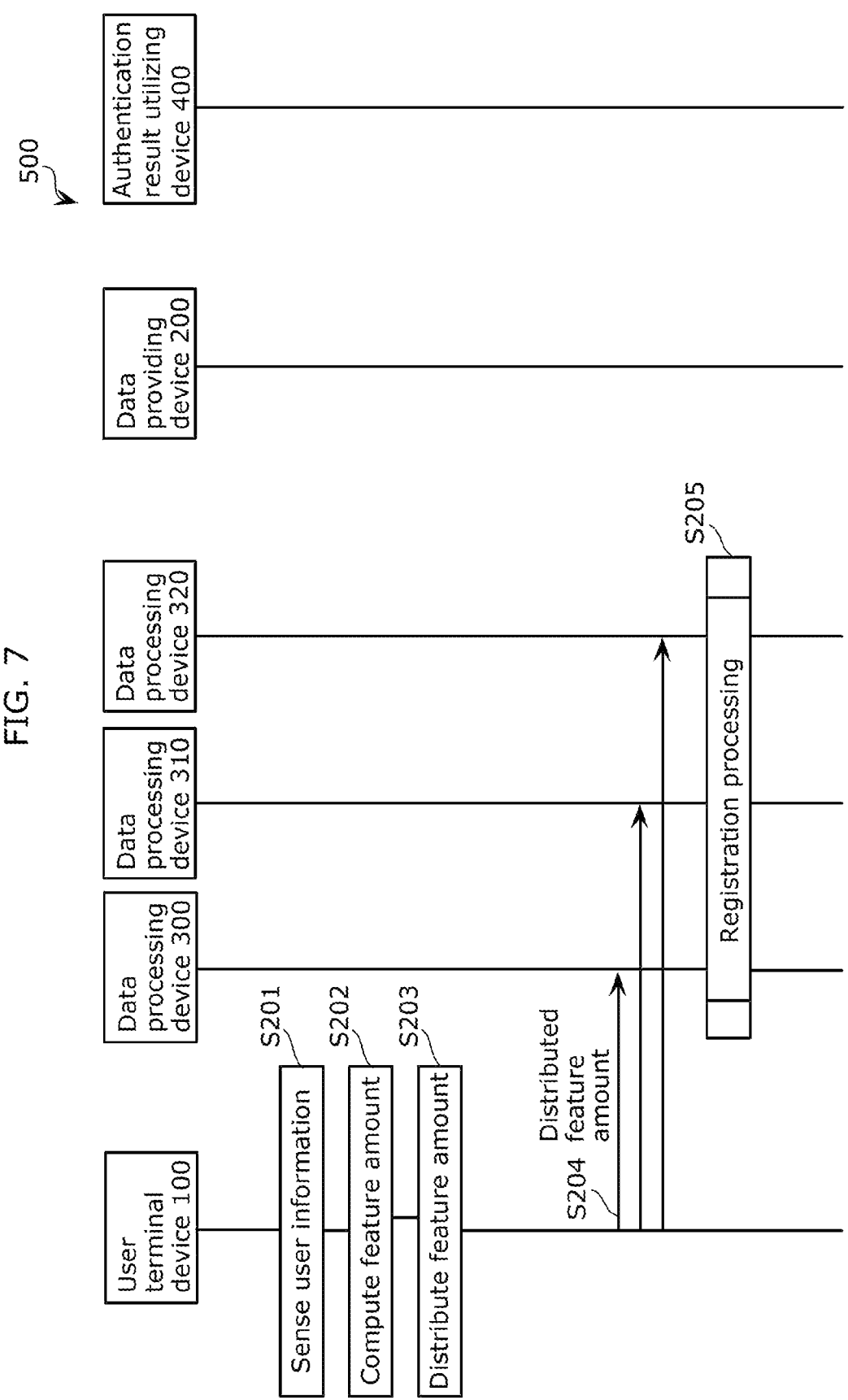
FIG. 7 is a sequence chart illustrating an example of operations of the secure authentication system in a registration phase according to the embodiment.

Next, operations of secure authentication system 500 in the registration phase will be described. FIG. 7 is a sequence chart illustrating an example of operations of secure authentication system 500 in a registration phase according to the embodiment.

In the registration phase, first, user terminal device 100 senses the user information using sensor 101 (S201). In step S201, if, for example, a face image for facial recognition is to be registered, sensor 101 captures a face image of the user.

Next, user terminal device 100 computes a feature amount from the user information sensed in step S201 using feature amount computer 102 (S202). Here, the method for computing the feature amount is assumed to be determined in advance by a service provider and shared among all user terminal devices 100.

Next, user terminal device 100 distributes, through the secret distribution method, the feature amount computed in step S202, using feature amount distributor 103 (S203), and sends the feature amount that has been distributed (called the "distributed feature amount") to data processing devices 300, 310, and 320 (S204).

Next, upon obtaining the distributed feature amount from user terminal device 100, data processing devices 300, 310, and 320 perform the user registration processing (S205).

Figure 8:
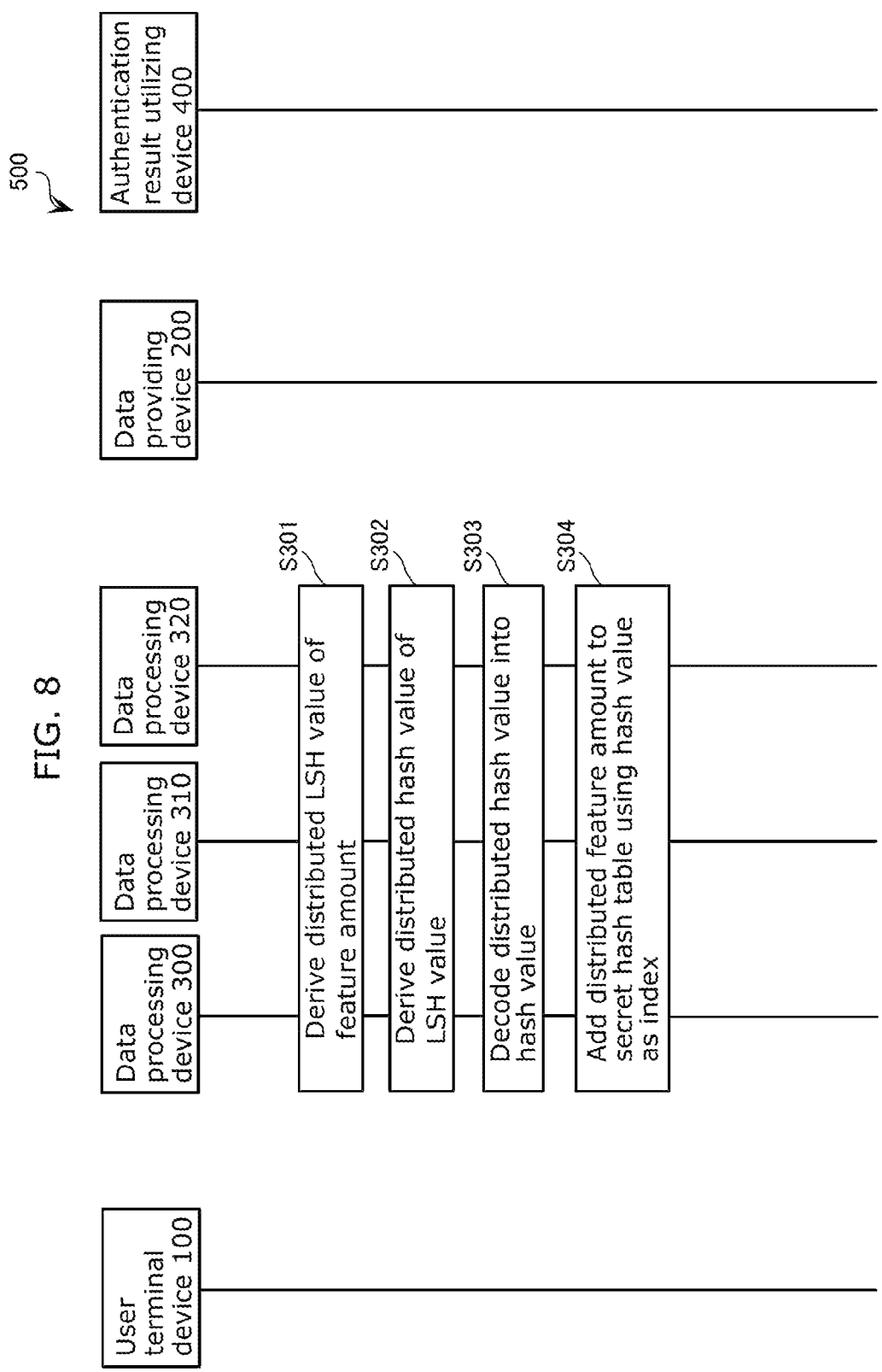
FIG. 8 is a sequence chart illustrating an example of details of processing performed in step S205 of FIG. 7.

The user registration processing will be described in detail below with reference to FIG. 8. FIG. 8 is a sequence chart illustrating an example of details of the process performed in step S205 of FIG. 7.

In the process of step S205, data processing devices 300, 310, and 320 derive the distributed LSH value of the feature amount using distributed LSH value deriver 303 (S301). More specifically, each of data processing devices 300, 310, and 320 takes the distributed feature amount obtained from user terminal device 100 and the LSH parameter stored in LSH parameter storage 302 (the distributed parameter) as inputs, and using secret LSH, which executes the processing of LSH while keeping the inputs secret, derives the distributed LSH value of the feature amount, using distributed LSH value deriver 303. Through this, data processing devices 300, 310, and 320 can derive the distributed LSH value without reversing the distribution, through the secret distribution method, of the obtained distributed feature amount.

Next, data processing devices 300, 310, and 320 derive the distributed hash value of the LSH value (S302). More specifically, data processing devices 300, 310, and 320 take the distributed LSH value derived in step S301 and the distributed key stored in distributed key storage 301 as inputs, and using distributed hash value deriver 305, and derive the distributed hash value of the LSH value using the secret unidirectional function, which executes the processing of the unidirectional function while keeping the inputs secret. Through this, data processing devices 300, 310, and 320 can derive the distributed hash value of the LSH value without reversing the distribution, through the secret distribution method, of the distributed LSH value.

Next, data processing devices 300, 310, and 320 decode the distributed hash value (S303). More specifically, using distributed hash value decoder 309, data processing devices 300, 310, and 320 decode the distributed hash value derived in step S302 into a hash value in which the distribution through the secret distribution method has been reversed.

Next, using the hash value obtained in step S303 as an index, data processing devices 300, 310, and 320 add the distributed feature amount obtained from user terminal device 100 to the secret hash table (S304). As described above, the secret hash table is a table storing a plurality of sets of a hash value as an index and a distributed feature amount as a data string in advance. Data processing devices 300, 310, and 320 use, for example, secret hash table storage 306 to reference the secret hash table, using the hash value obtained in step S303 as an index, and add the distributed feature amount sent from user terminal device 100 to the data string in the row indicated by the hash value.

Through this, in the registration phase, each of data processing devices 300, 310, and 320 perform the user registration processing by deriving the hash value of the LSH value of the distributed feature amount sent from user terminal device 100 without reversing the distribution through the secret distribution method, and adding the distributed feature amount sent from user terminal device 100 to the data string in the row indicated by the derived hash value (i.e., the distributed hash value).

2.3 Authentication Phase

Figure 9:
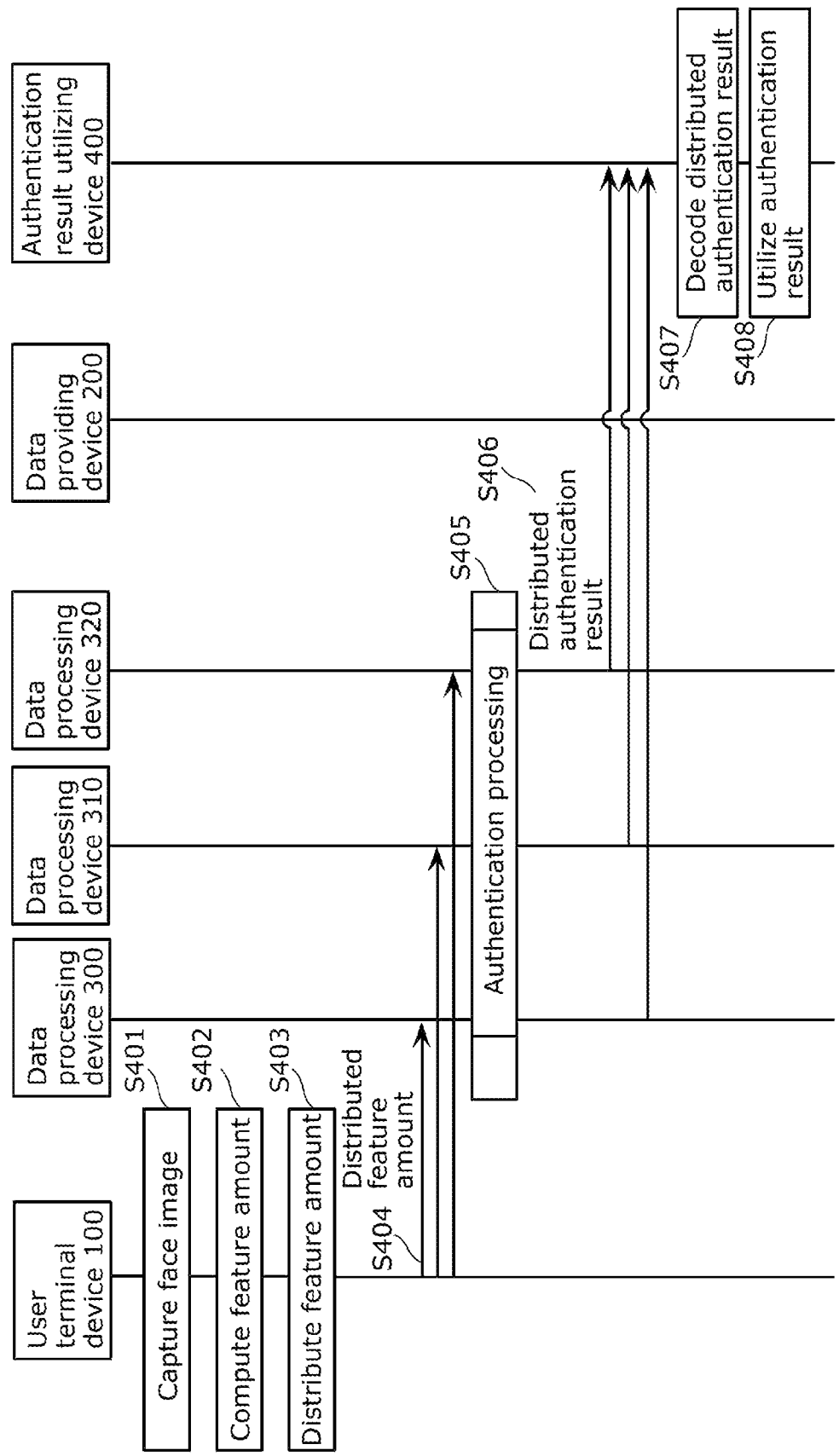
FIG. 9 is a sequence chart illustrating an example of operations of the secure authentication system in an authentication phase according to the embodiment.

Next, operations of secure authentication system 500 in the authentication phase will be described. FIG. 9 is a sequence chart illustrating an example of operations of secure authentication system 500 in the authentication phase according to the present embodiment.

In the authentication phase, first, user terminal device 100 senses the user information using sensor 101 (S401). In step S401, if, for example, a face image for facial recognition has been registered in step S201 of the registration phase, sensor 101 captures a face image of the user.

Next, user terminal device 100 computes a feature amount from the user information sensed in step S401 using feature amount computer 102 (S402). Note that like step S202, the method for computing the feature amount is assumed to be determined in advance by a service provider and shared among all user terminal devices 100.

Next, user terminal device 100 distributes, through the secret distribution method, the feature amount computed in step S402, using feature amount distributor 103 (S403), and sends the feature amount that has been distributed (called the "distributed feature amount") to data processing devices 300, 310, and 320 (S404).

Next, upon obtaining the distributed feature amount from user terminal device 100 (called the "first distributed feature amount" in the authentication phase hereinafter), data processing devices 300, 310, and 320 perform the user authentication processing (S405). The user authentication processing will be described in detail later.

Next, data processing devices 300, 310, and 320 send, to authentication result utilizing device 400, the distributed authentication result obtained through the user authentication processing of step S405 (S406).

Next, authentication result utilizing device 400 decodes the distributed authentication result obtained from data processing devices 300, 310, and 320 (S407). More specifically, upon obtaining the distributed authentication result sent from data processing devices 300, 310, and 320, authentication result utilizing device 400 reverses the distribution, through the secret distribution method, of the distributed authentication result, using distributed authentication result decoder 401, and decodes the distributed authentication result into a plaintext authentication result.

Next, authentication result utilizing device 400 uses the authentication result decoded in step S407 in authentication result utilizer 402 (S408). For example, authentication result utilizer 402 may use the authentication result to present information pertaining to the authentication result to a receptionist or the user, or may use the authentication result to open entry and exit gates to an event venue. This may be a door to a building, a room, or the like, for example, instead of an entry and exit gate to an event venue.

The user authentication processing will be described in detail below with reference to FIG. 10. FIG. 10 is a sequence chart illustrating an example of details of the processing performed in step S405 of FIG. 9.

In the process of step S405, data processing devices 300, 310, and 320 derive the distributed LSH value of the feature amount using distributed LSH value deriver 303 (S501). More specifically, each of data processing devices 300, 310, and 320 takes the distributed feature amount obtained from user terminal device 100 and the LSH parameter stored in LSH parameter storage 302 (called the "distributed LSH parameter") as inputs, and using secret LSH, which executes the processing of LSH while keeping the inputs secret, derives the distributed LSH value of the feature amount, using distributed LSH value deriver 303. Through this, data processing devices 300, 310, and 320 can derive the distributed LSH value without reversing the distribution, through the secret distribution method, of the obtained distributed feature amount.

Next, data processing devices 300, 310, and 320 derive the distributed hash value of the LSH value (S502). More specifically, data processing devices 300, 310, and 320 take the distributed LSH value derived in step S501 and the distributed key stored in distributed key storage 301 as inputs, and using distributed hash value deriver 305, and derive the distributed hash value of the LSH value using the secret unidirectional function, which executes the processing of the unidirectional function while keeping the inputs secret. Through this, data processing devices 300, 310, and 320 can derive the distributed hash value of the LSH value without reversing the distribution, through the secret distribution method, of the distributed LSH value.

Next, data processing devices 300, 310, and 320 decode the distributed hash value (S503). More specifically, using distributed hash value decoder 309, data processing devices 300, 310, and 320 decode the distributed hash value derived in step S502 into a hash value in which the distribution through the secret distribution method has been reversed.

Next, data processing devices 300, 310, and 320 use distributed authentication result deriver 307 to reference the secret hash table, using the hash value obtained in step S503 as an index, and extract a distributed feature amount group stored in the data string of the row indicated by the hash value (S504). The distributed feature amount group is, for example, a list including at least zero distributed feature amounts. Note that the secret hash table may be a table storing a plurality of sets of a hash value as an index and a distributed feature amount as a data string in advance. In this case, using distributed authentication result deriver 307, data processing devices 300, 310, and 320 may use the secret hash table to select, from among the plurality of sets, the set including a hash value matching the hash value decoded by distributed hash value decoder 309.

Next, data processing devices 300, 310, and 320 compute a distributed similarity (called a "similarity" hereinafter) between all of the distributed feature amounts included in the distributed feature amount group extracted from the secret hash table in step S504 and the distributed feature amount for authentication, sent from user terminal device 100 in step S404 (called the "first distributed feature amount") (S505). For example, using distributed authentication result deriver 307, data processing devices 300, 310, and 320 may compute the similarity between the distributed feature amount included in the set selected from the secret hash table and the first distributed feature amount while keeping the similarity secret.

Next, data processing devices 300, 310, and 320 derive an authentication result of the user based on the similarity computed in step S505. For example, using distributed authentication result deriver 307, data processing devices 300, 310, and 320 derive the authentication result by extracting, as the second distributed feature amount, the distributed feature amount, among the distributed feature amount group, that has the highest similarity with the distributed feature amount for authentication (i.e., the first distributed feature amount), and determining whether or not the similarity between the extracted second distributed feature amount and the first distributed feature amount is higher than a threshold (S506).

In step S506, for example, using distributed authentication result deriver 307, data processing devices 300, 310, and 320 output a distributed value of a numerical value indicating that the user authentication is successful as the authentication result if it is determined that the similarity is higher than the threshold, and output a distributed value of a numerical value indicating that the user authentication has failed (i.e., that the user has been rejected) as the authentication result if it is determined that the similarity is less than or equal to the threshold.

The numerical value indicating the user authentication is successful and the numerical value indicating that the user authentication has failed are different numerical values, and may be any numerical value determined by the system. For example, the numerical value indicating that the user authentication is successful may be 1, and the numerical value indicating that the user has been rejected may be 0.

Through this, in the authentication phase, data processing devices 300, 310, and 320 use the secret LSH and the secret unidirectional function to perform the authentication processing while keeping the user information sent by the user for authentication and the user information pre-registered in the secret hash table by the user secret. In the authentication processing, data processing devices 300, 310, and 320 can efficiently search for the user information having the highest similarity with the user information to be authenticated by extracting, as the second distributed feature amount, the distributed feature amount having the highest similarity with the distributed feature amount for authentication (called the "first distributed feature amount"). Then, data processing devices 300, 310, and 320 determine whether or not the similarity between the extracted second distributed feature amount and the first distributed feature amount is higher than the threshold, and output a distributed value of a numerical value indicating whether or not the authentication is successful as the authentication result.

Although the foregoing has described an example of secure authentication system 500, secure authentication system 500 may be a system that includes at least the following configurations.

Secure authentication system 500 may include, for example, distributed LSH value deriver 303 (see FIG. 4), distributed hash value deriver 305 (see FIG. 4), distributed hash value decoder 309 (see FIG. 4), secret hash table storage 306 (see FIG. 4), distributed authentication result deriver 307 (see FIG. 4), and an outputter (corresponding to communicator 308 in FIG. 4). These elements have already been described above, and will therefore not be mentioned here.

Figure 16:
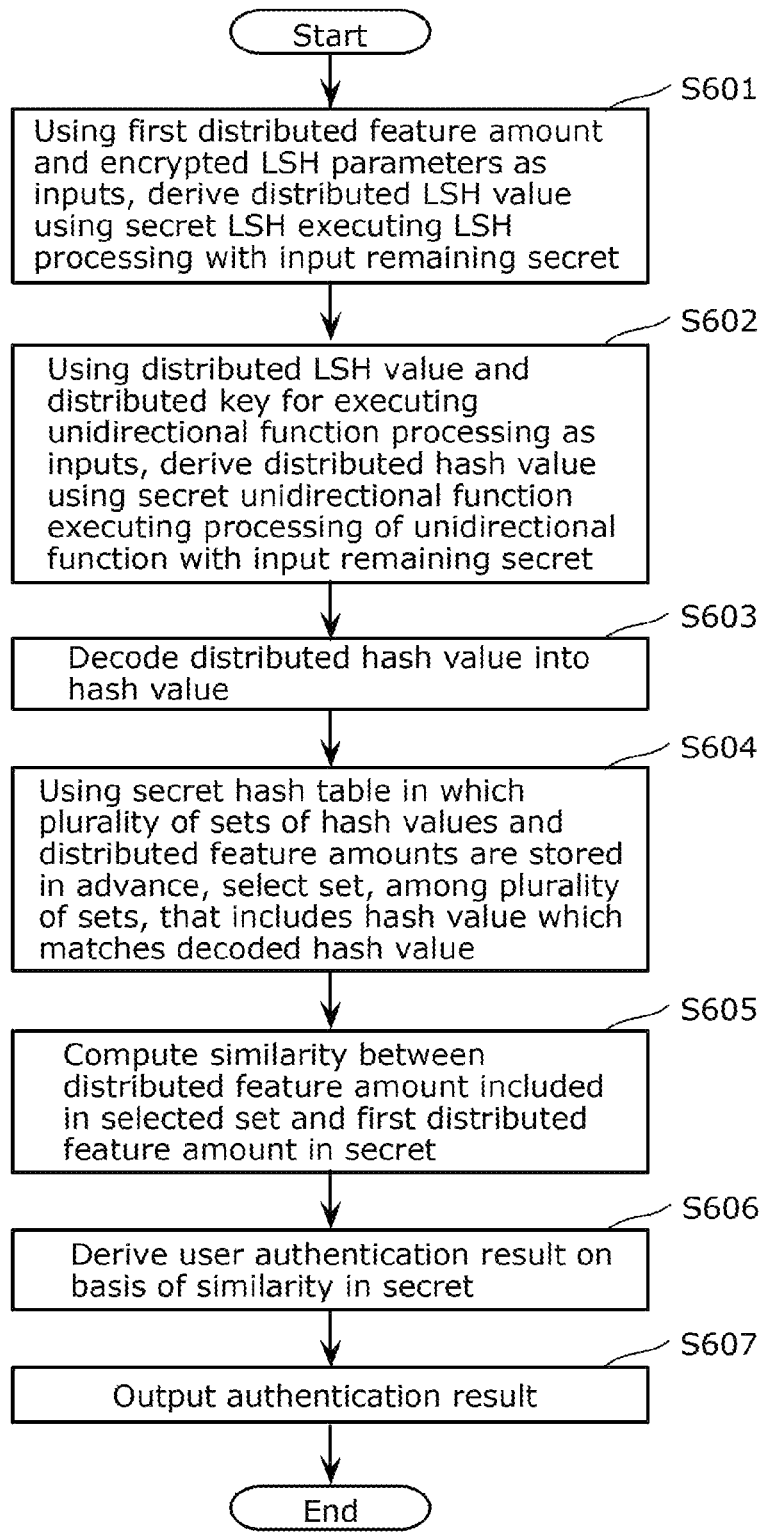
FIG. 16 is a flowchart illustrating an example of a secure authentication method according to an embodiment.

Additionally, a secure authentication method may be a method including at least the following processing flow. FIG. 16 is a flowchart illustrating an example of the secure authentication method according to the present embodiment. As illustrated in FIG. 16, the secure authentication method executed by secure authentication system 500 includes, for example: deriving a distributed Locality Sensitive Hashing (LSH) value by taking a first distributed feature amount and an encrypted LSH parameter as inputs and using secret LSH that executes processing of the LSH while keeping the inputs secret, the distributed LSH value being an LSH value that is encrypted and that is distributed, the first distributed feature amount being a feature amount of user information pertaining to a user and that is encrypted and is distributed using a secret distribution method, and the encrypted LSH parameter being a parameter encrypted through LSH (S601); deriving a distributed hash value, which is a hash value that is encrypted and distributed, taking the distributed LSH value derived and a distributed key that is a key for executing processing of a unidirectional function and that has been encrypted and distributed, as inputs, and using a secret unidirectional function that executes the processing of the unidirectional function while keeping the inputs secret (S602); decoding the distributed hash value derived into a hash value for which distribution through the secret distribution method has been reversed (S603); using a secret hash table, which is a table storing a plurality of sets of a hash value as an index and a distributed feature amount as a data string in advance, selecting a set, among the plurality of sets, including a hash value that matches the hash value obtained from the decoding (S604); computing a similarity between the distributed feature amount included in the set selected and the first distributed feature amount while keeping the similarity secret (S605); deriving an authentication result of the user based on the similarity computed while keeping the authentication result secret (S606); and outputting the authentication result derived (S607).

Other Embodiments

A secure authentication system and a secure authentication method according to the present disclosure have been described based on an embodiment. However, the present disclosure is not limited to the foregoing embodiment. Variations on the embodiment conceived by one skilled in the art, other embodiments implemented by combining constituent elements from the embodiments, and the like, for as long as they do not depart from the essential spirit thereof, fall within the scope of the present disclosure. The present disclosure is also inclusive of the following cases, for example.

(1) In the foregoing embodiment, a user is authenticated using a feature amount of, for example, a face image as the feature amount of the user information. However, for the user authentication, a feature amount of a user's physical feature, such as a retina image, an iris image, a fingerprint image, a vein image, voice information, ear shape information, DNA information, or a palm image may be used; or, a feature amount of a user's behavioral feature, such as handwriting, keystrokes, gait, behavioral history, or the like may be used; or, a feature amount pertaining to a feature of a user's possessions, such as document information in the user's possession, a user's memory, or an item carried by the user (a possession) may be used.

(2) In the foregoing embodiment, the user is authenticated using only a single feature amount (e.g., the first distributed feature amount), but for example, the user may be authenticated using a combination of a plurality of types of the feature amounts indicated in (1) above. For example, the user may be authenticated using a fingerprint image and an iris image. In this case, even if the user is successfully authenticated using the fingerprint image, the user will be rejected if the user authentication using the iris image fails.

(3) In the foregoing embodiment, user terminal device 100 computes the feature amount from user information, but the feature amount may be computed from user information by data processing devices 300, 310, and 320 computing the feature amount from user information. In this case, data processing devices 300, 310, and 320 compute the distributed feature amount from the distributed user information. For example, user terminal device 100 sends the distributed user information, which is the user information that has been distributed, to data processing devices 300, 310, and 320. Upon obtaining the distributed user information, data processing devices 300, 310, and 320 compute the feature amount while keeping the user information secret, i.e., compute the distributed feature amount from the distributed user information.

In the foregoing embodiment, user terminal device 100 sends the distributed feature amount to data processing devices 300, 310, and 320 in the registration phase and the authentication phase, but data processing devices 300, 310, and 320 may compute the distributed feature amount from the distributed user information sent from user terminal device 100. Note that any computation method can be used in the registration phase and the authentication phase as long as the method of computing the feature amount is the same.

(4) In the foregoing embodiment, user terminal device 100 computes the feature amount from the user information, but a feature amount computation device that computes a feature amount may be prepared separate from user terminal device 100, and the feature amount of the user information may be computed by the feature amount computation device.

In this case, user terminal device 100 may send the distributed user information, in which the user information is distributed, to the feature amount computation device, and the feature amount computation device may compute the feature amount while keeping the user information secret. Additionally, user terminal device 100 may send the user information to the feature amount computation device, and the feature amount computation device may compute the feature amount from the user information.

Note that when encrypted user information is sent to the feature amount computation device, it is necessary for the feature amount computation device to be a trusted device, and that the user information will not be leaked from the feature amount computation device.

(5) In the foregoing embodiment, the distributed feature amount is included in a data string in the secret hash table, but distributed user information such as a distributed user ID may be included as well. The user information stored in the secret hash table is not limited thereto, and may be any data as long as the distributed feature amount is included in a data string in the secret hash table. In this case, in addition to a numerical value indicating whether or not the authentication is successful serving as the authentication result, data processing devices 300, 310, and 320 may output the user information stored in the secret hash table.

(6) In the foregoing embodiment, when performing the authentication processing, data processing devices 300, 310, and 320 compare, with a threshold, the similarity between the distributed feature amount for authentication (the first distributed feature amount) and the distributed feature amount having the highest similarity (the second distributed feature amount), and output, as the authentication result, a distributed value of a numerical value indicating whether or not the authentication is successful. However, the distributed feature amount selected from the secret hash table, and distributed user information such as a distributed user ID corresponding thereto, may be output to authentication result utilizing device 400. In this case, authentication result utilizing device 400, which has received the distributed feature amount, the distributed user ID, or other distributed user information from data processing devices 300, 310, and 320, may authenticate the user by comparing the user information to be authenticated with the user information sent from data processing devices 300, 310, and 320.

(7) In the foregoing embodiment, data processing devices 300, 7310, and 320 send the distributed authentication result to authentication result utilizing device 400, but data processing devices 300, 310, and 320 may send the authentication result to authentication result utilizing device 400 after decoding the distributed authentication result into the authentication result. Accordingly, authentication result utilizing device 400 does not need to decode the distributed authentication result into a plaintext authentication result, and can therefore use the received authentication result as-is.

(8) In the foregoing embodiment, data processing devices 300, 310, and 320 send the distributed authentication result to authentication result utilizing device 400, but the distributed authentication result may be sent to user terminal device 100. In this case, user terminal device 100 may include, for example, distributed authentication result decoder 401 and authentication result utilizer 402, and may decode and use the obtained distributed authentication result.

(9) In the foregoing embodiment, data processing devices 300, 310, and 320 send the distributed authentication result to authentication result utilizing device 400, but the distributed authentication result may be sent to both authentication result utilizing device 400 and user terminal device 100.

(10) The foregoing embodiment described using AES as the unidirectional function, but any function may be used as the unidirectional function as long as it is a function through which an input cannot be found from an output.

(11) In the foregoing (10), any function may be used as the unidirectional function as long as it is a function through which an input cannot be found from an output. However, any function that can provide randomness in the output by using random values in the computation of the unidirectional function may be used, such as a power function, a cryptographic hash function such as SHA or MD5, or the like.

When such a function is not used, it is possible to create a correspondence table for inputs and outputs by performing the computation of a unidirectional function with all possible values of LSH values as inputs. Accordingly, particularly when there are few possible values which the LSH value can take on, the stated correspondence table can be created with ease, and the LSH values input to the unidirectional function can be easily obtained using the correspondence table. Because the user information can be identified from the LSH value, this poses a problem in terms of user information security. However, by using the function described as an example in (11), the stated correspondence table cannot be created, which makes it difficult to find the input from the output of the unidirectional function. The security of the user information is therefore improved.

(12) In the foregoing embodiment, AES is used as the unidirectional function, but ElGamal encryption, RSA encryption, public key encryption such as elliptic curve encryption, or the like may be used as well. When public key encryption is used, the public key can be deleted after the key pair is created to make the unidirectionality stronger than AES.

(13) The foregoing embodiment mentions an AES encryption key as an example of a key to be used in a unidirectional function, but if a plurality of pieces of data aside from the input data are required to compute the unidirectional function, that data may be grouped together as a key. Additionally, when the key indicates a plurality of pieces of information, key distributor 203 of data providing device 200 need not distribute all of that information, and some of the information may be sent to data processing devices 300, 310, and 320 as plain text to the extent that information pertaining to the input cannot be found from the output of the unidirectional function.

(14) In the foregoing embodiment, each piece of data is made secret using a secret distribution method, but homomorphic encryption (NPL 10: Pascal Paillier, "Public-Key Cryptosystems Based on Composite Degree Residuosity Classes" (https://rd.springer.com/chapter/10.1007%2F3-540-48910-X_16)), fully homomorphic encryption (NPL 11: Jung Hee Cheon, et al., "Hommorphic Encryption for Arithmetic of Approximate Numbers" (eprint.iacr.org/2016/421.pdf); NPL 12: Junfeng Fan, et al., "Somewhat Practical Fully Homomorphic Encryption" (https://eprint.iacr.org/2012/144.pdf)), or GarbledCircuit (NPL 13: Andrew Chi-Chih Yao, "How to generate and exchange secrets" (ieeexploreleee.org/document/4568207?arnumber=4568207)) may be used instead.

(15) In the foregoing embodiment, SimHash is used as the LSH hash function, but MinHash may be used.

(16) In the foregoing embodiment, the computation of the similarity between the distributed feature amount included in the set selected from the secret hash table and the first distributed feature amount may be performed using a Euclidean distance, a square value of a Euclidean distance, a Manhattan distance, a Hamming distance, a Levenshtein distance, cosine similarity, Pearson's correlation coefficient, or the like. Here, the similarity being high means a low Euclidean distance, squared Euclidean distance, Manhattan distance, Hamming distance, or Levenshtein distance, or a high cosine similarity or Pearson's correlation coefficient.

(17) Each device in the foregoing embodiments is specifically a computer system constituted by a microprocessor, Read Only Memory (ROM), Random Access Memory (RAM), a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(18) Some or all of the constituent elements constituting the devices in the foregoing embodiment may be implemented by a single integrated circuit through system Large-Scale Integration (LSI). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions of the devices by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as Integrated Circuit (IC), LSI, super LSI, ultra LSI, and so on may be used, depending on the level of integration. Furthermore, the manner in which the circuit integration is achieved is not limited to LSI, and it is also possible to use a dedicated circuit or a generic processor. It is also possible to employ a Field Programmable Gate Array (FPGA) which is programmable after the LSI circuit has been manufactured, or a reconfigurable processor in which the connections or settings of the circuit cells within the LSI circuit can be reconfigured.

Furthermore, if other technologies that improve upon or are derived from semiconductor technology enable integration technology to replace LSI circuits, then naturally it is also possible to integrate the function blocks using that technology. Biotechnology applications are one such foreseeable example.

(19) Some or all of the constituent elements constituting the foregoing devices may be constituted by IC cards or stand-alone modules that can be removed from and mounted in the apparatus. The IC card or the module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(20) The present disclosure may be realized by the methods described above. This may be a computer program that implements these methods on a computer, or a digital signal constituting the computer program.

Additionally, the present disclosure may also be computer programs or digital signals recorded in a computer-readable recording medium such as a flexible disk, a hard disk, a CD-ROM, an Magneto-Optical Disc (MO), a DVD, a DVD-ROM, a DVD-RAM, a Blu-ray (registered trademark) Disc (BD), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

Additionally, the present disclosure may be a computer system including a microprocessor and memory, where the memory records the above-described computer program and the microprocessor operates in accordance with the computer program.

Additionally, the present disclosure may be implemented by another independent computer system, by recording the program or the digital signal in the recording medium and transferring the recording medium, or by transferring the program or the digital signal over the network or the like.

(21) The above-described embodiment and variations may be combined as well.

INDUSTRIAL APPLICABILITY

The present disclosure can be applied in systems that protect privacy by ensuring data processing devices do not handle a user's sensitive information as plain text.

The invention claimed is:

1. A secure authentication method for performing authentication processing while keeping an input secret, the secure authentication method comprising:

deriving a distributed Locality Sensitive Hashing (LSH) value by taking a first distributed feature amount and a distributed LSH parameter as inputs and using secret LSH that executes processing of the LSH while keeping the inputs secret, the distributed LSH value being an LSH value that is distributed, the first distributed feature amount being a feature amount of user information pertaining to a user and that is distributed using a secret distribution method, and the distributed LSH parameter being a parameter distributed through the secret distribution method of the LSH;

deriving a distributed hash value, which is a hash value that is distributed, taking the distributed LSH value derived and a distributed key that is a key for executing processing of a unidirectional function and that has been distributed, as inputs, and using a secret unidirectional function that executes the processing of the unidirectional function while keeping the inputs secret;

decoding the distributed hash value derived into a hash value for which distribution through the secret distribution method has been reversed;

selecting a set, among a plurality of sets, including a hash value that matches the hash value obtained from the decoding, using a secret hash table, which is a table storing the plurality of sets of a hash value as an index and a distributed feature amount as a data string in advance;

computing a similarity between the distributed feature amount included in the set selected and the first distributed feature amount while keeping the similarity secret;

deriving an authentication result of the user based on the similarity computed while keeping the authentication result secret; and outputting the authentication result derived.

2. The secure authentication method according to claim 1, wherein the deriving of the authentication result of the user includes:

extracting, as a second distributed feature amount, a distributed feature amount that, of the distributed feature amount included in the set selected, has a similarity with the first distributed feature amount that is highest;

determining whether the similarity between the second distributed feature amount extracted and the first distributed feature amount is higher than a threshold;

outputting a distributed numerical value indicating that authentication of the user is successful as the authentication result when the similarity is determined to be higher than the threshold, and outputting a distributed numerical value indicating that authentication of the user is unsuccessful as the authentication result when the similarity is determined to be no higher than the threshold, when the similarity is determined to be no higher than the threshold.

3. The secure authentication method according to claim 1, wherein the feature amount is one of a physical feature amount pertaining to a physical feature of the user, a behavioral feature amount pertaining to a behavioral feature of the user, or a possession feature amount pertaining to a possession of the user, the physical feature amount includes a feature amount of at least one of the following information: a retina image, an iris image, a fingerprint image, a vein image, voice information, ear shape information, deoxyribonucleic acid (DNA) information, or a palm image, the behavioral feature amount includes a feature amount of at least one of the following information: handwriting, a keystroke, a gait, and a behavioral history, and the possession feature amount includes a feature amount of at least one piece of information including document information, a memory, and a possession of the user.

4. The secure authentication method according to claim 1, wherein each of the first distributed feature amount and the distributed feature amount includes types of feature amounts that are distributed, and the computing of the similarity between the distributed feature amount included in the set selected and the first distributed feature amount includes computing, for each of the types of feature amounts, a similarity between the distributed feature amount and the first distributed feature amount.

5. The secure authentication method according to claim 1, wherein the distributed hash value has randomness.

6. The secure authentication method according to claim 1, wherein the data string further includes a distributed user ID which is a user ID that has been distributed.

7. The secure authentication method according to claim 6, wherein the outputting of the authentication result includes outputting the authentication result derived and at least one of the distributed feature amount or the user ID included in the data string of the set selected.

8. The secure authentication method according to claim 1, wherein a user terminal device of the user computes the feature amount from the user information which has been obtained through sensing, and derives the first distributed feature amount by distributing, through the secret distribution method, the feature amount derived.

9. The secure authentication method according to claim 1, wherein a user terminal device of the user sends the user information which has been obtained through sensing to a server that is trusted and does not leak information, and the server derives the feature amount from the user information, and derives the first distributed feature amount by distributing, using the secret distribution method, the feature amount derived.

10. The secure authentication method according to claim 1,
wherein the first distributed feature amount is derived by a computing device that derives the authentication result of the user, a user terminal device of the user sends distributed user information to the computing device, the distributed user information being the user information obtained by sensing and having been distributed through the secret distribution method, and the computing device derives the first distributed feature amount from the distributed user information.

11. The secure authentication method according to claim 1,
wherein the distributed LSH parameter is sent to a computing device that derives the authentication result of the user, and the computing device derives the distributed LSH value using the secret LSH, taking the first distributed feature amount and the distributed LSH parameter as inputs.

12. The secure authentication method according to claim 1,
wherein the LSH is SimHash.

13. The secure authentication method according to claim 1,
wherein the LSH is MinHash.

14. The secure authentication method according to claim 1,
wherein the unidirectional function is Advanced Encryption Standard (AES).

15. The secure authentication method according to claim 1,
wherein the unidirectional function is Secure Hash Algorithm (SHA) or Message Digest 5 (MD5).

16. The secure authentication method according to claim 1,
wherein the unidirectional function is ElGamal encryption, Rivest-Shamir-Adleman (RSA) encryption, or elliptic curve encryption.

17. A secure authentication system that performs authentication processing while keeping an input secret, the secure authentication system comprising:
- a processor; and
- a memory including a program that, when executed by the processor, causes the processor to achieve functions, the functions including:
  - deriving a distributed Locality Sensitive Hashing (LSH) value, which is an LSH value that is encrypted and distributed, by taking a first distributed feature amount and an encrypted LSH parameter as inputs and using secret LSH that executes processing of the LSH while keeping the inputs secret, the first distributed feature amount being a feature amount of user information pertaining to a user and that is encrypted and that is distributed using a secret distribution method, the distributed LSH parameter being an encrypted parameter of the LSH;
  - deriving, taking the distributed LSH value derived by the processor, and a distributed key that is a key for executing processing of a unidirectional function and that has been encrypted and distributed, as inputs, a distributed hash value, the distributed hash value being a hash value that is encrypted using a secret unidirectional function that executes processing of the unidirectional function while keeping the inputs secret and that is distributed;
  - decoding the distributed hash value derived by the processor into a hash value for which distribution through the secret distribution method has been reversed;
  - storing a secret hash table, the secret hash table being a table storing a plurality of sets of a hash value as an index and a distributed feature amount as a data string in advance;
  - selecting, using the secret hash table, a set, among the plurality of sets, including a hash value that matches the hash value obtained from the decoding, computing a similarity between the distributed feature amount included in the set selected and the first distributed feature amount while keeping the similarity secret, and deriving an authentication result of the user based on the similarity computed while keeping the authentication result secret; and
  - outputting the authentication result derived by the processor.

* * * * *